(12) United States Patent
Igarashi

(10) Patent No.: US 9,817,332 B2
(45) Date of Patent: Nov. 14, 2017

(54) OPTICAL SCANNING DEVICE AND IMAGE FORMING APPARATUS INCLUDING THE SAME

(71) Applicant: CANON KABUSHIKI KAISHA, Tokyo (JP)

(72) Inventor: Jun Igarashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/216,459

(22) Filed: Jul. 21, 2016

(65) Prior Publication Data

US 2017/0031266 A1   Feb. 2, 2017

(30) Foreign Application Priority Data

Jul. 27, 2015 (JP) .................. 2015-148157
May 10, 2016 (JP) .................. 2016-094831

(51) Int. Cl.
*G03G 15/00*   (2006.01)
*G03G 15/043*  (2006.01)
(Continued)

(52) U.S. Cl.
CPC ......... *G03G 15/043* (2013.01); *G02B 26/124* (2013.01); *G02B 26/127* (2013.01);
(Continued)

(58) Field of Classification Search
CPC ......... G03G 15/0435; G03G 15/04036; G03G 15/043; G03G 15/011; G03G 15/0409; G03G 2215/0404
(Continued)

(56) References Cited

U.S. PATENT DOCUMENTS 5,497,184 A * 3/1996 Saito .................. G02B 26/127
                                                    347/257
5,748,357 A   5/1998 Park
(Continued)

FOREIGN PATENT DOCUMENTS

JP   H03-274016 A   12/1991
JP   H11-337851 A   12/1999
(Continued)

*Primary Examiner* — Walter L Lindsay, Jr.
*Assistant Examiner* — Jessica L Eley
(74) *Attorney, Agent, or Firm* — Canon USA Inc., IP Division

(57) ABSTRACT

An optical scanning device includes a deflecting unit having a deflecting surface, and arranged to deflect a light beam and optically scan a scanned surface in a main-scanning direction; an incident optical system arranged to cause the light beam to be obliquely incident on the deflecting surface in a sub-scanning section; and a light receiving unit arranged to receive a light beam deflected by the deflecting surface and generate a signal. A following condition is satisfied, $$|\beta| \le |\alpha|,$$

where $\alpha$ (deg) is an incident angle of the light beam from the incident optical system with respect to the deflecting surface in the sub-scanning section, and $\beta$ (deg) is an angle defined by the light beam incident on the deflecting surface and the light beam deflected by the deflecting surface and directed toward the light receiving unit in a main-scanning section.

20 Claims, 14 Drawing Sheets

(51) Int. Cl.
  *H04N 1/113* (2006.01)
  *H04N 1/024* (2006.01)
  *G02B 26/12* (2006.01)

(52) U.S. Cl.
  CPC ......... *H04N 1/02481* (2013.01); *H04N 1/113* (2013.01); *H04N 2201/0094* (2013.01)

(58) Field of Classification Search
  USPC .................................................. 399/177, 218
  See application file for complete search history.

(56) References Cited

U.S. PATENT DOCUMENTS

| | | | |
|---|---|---|---|
| 5,771,115 | A | 6/1998 | Takanashi |
| 2003/0234857 | A1 | 12/2003 | Nakahata |
| 2007/0053041 | A1 | 3/2007 | Nakahata |
| 2011/0063691 | A1* | 3/2011 | Shimomura ......... G02B 26/125 358/474 |
| 2012/0050444 | A1* | 3/2012 | Sakai ...................... B41J 2/473 347/124 |
| 2012/0320140 | A1 | 12/2012 | Sakurai |
| 2014/0071220 | A1 | 3/2014 | Kuribayashi |

FOREIGN PATENT DOCUMENTS

| | | |
|---|---|---|
| JP | 2004-240275 A | 8/2004 |
| JP | 2004-345172 A | 12/2004 |
| JP | 2007-298997 A | 11/2007 |
| JP | 2008-191435 A | 8/2008 |
| JP | 2008-225060 A | 9/2008 |
| JP | 2008-233429 A | 10/2008 |
| JP | 2008-287018 A | 11/2008 |
| JP | 2009-115943 A | 5/2009 |
| JP | 2010-008775 A | 1/2010 |
| JP | 2011-118224 A | 6/2011 |
| JP | 2013-130623 A | 7/2013 |
| JP | 2013-156425 A | 8/2013 |

* cited by examiner

OPTICAL SCANNING DEVICE AND IMAGE FORMING APPARATUS INCLUDING THE SAME

BACKGROUND OF THE INVENTION

Field of the Invention

The present invention relates to an image forming apparatus, such as a laser beam printer (LBP), a digital copier, or a multi-functional printer (multi-featured printer); and an optical scanning device included in the image forming apparatus.

Description of the Related Art

As the optical scanning device included in the image forming apparatus, there is known an optical scanning device that deflects light beams from a light source by a deflecting unit, and optically scans a scanned surface in a main-scanning direction. In such an optical scanning device, to optically scan the scanned surface with high accuracy, a synchronous detection unit is required for detecting the light beams deflected by the deflecting unit and determining a write-start position in the main-scanning direction on the scanned surface.

Japanese Patent Laid-Open No. 2009-115943 describes a configuration that separates light beams from a light source by a light-beam separating element, and guides the light beams respectively to a scanned surface and the synchronous detection unit. Also, Japanese Patent Laid-Open No. 2007-298997 describes a configuration that reflects light beams, which have passed through an end portion of an imaging lens, by using a mirror, and guides the light beams to a synchronous detection unit.

However, with the configurations of Japanese Patent Laid-Open No. 2009-115943 and Japanese Patent Laid-Open No. 2007-298997, since the light-beam separating element and mirror are required, the device may be complicated, and the synchronous detection with high accuracy may be no longer executed due to an arrangement error of respective components. Also, with the configurations of Japanese Patent Laid-Open No. 2009-115943 and Japanese Patent Laid-Open No. 2007-298997, respective members are required to be arranged so that light beams directed toward a scanned surface are not blocked in a main-scanning section, and hence the apparatus is not sufficiently reduced in size.

SUMMARY OF THE INVENTION

The present invention provides an optical scanning device and an image forming apparatus that can attain synchronous detection with high accuracy and reduction in size by a simple configuration.

The present invention provides an optical scanning device including a deflecting unit having a deflecting surface, and arranged to deflect a light beam and optically scan a scanned surface in a main-scanning direction; an incident optical system arranged to cause the light beam to be obliquely incident on the deflecting surface in a sub-scanning section; and a light receiving unit arranged to receive a light beam deflected by the deflecting surface and generate a signal. A following condition is satisfied, $$|\beta| \leq |\alpha|,$$

where $\alpha$ (deg) is an incident angle of the light beam from the incident optical system with respect to the deflecting surface in the sub-scanning section, and $\beta$ (deg) is an angle defined by the light beam incident on the deflecting surface and the light beam deflected by the deflecting surface and directed toward the light receiving unit in a main-scanning section.

Further features of the present invention will become apparent from the following description of exemplary embodiments with reference to the attached drawings.

DESCRIPTION OF THE EMBODIMENTS

Figure 1:
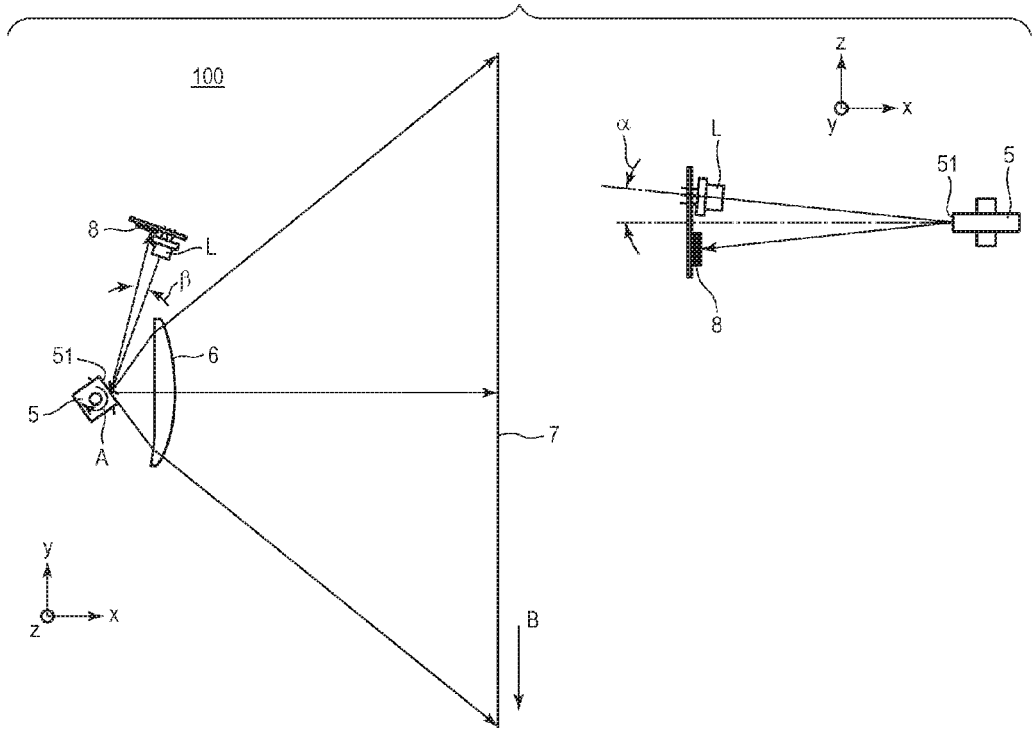
FIG. 1 provides schematic illustrations of a primary portion of an optical scanning device according to a first embodiment of the present invention.

Desirable embodiments of the present invention are described below with reference to the drawings. The drawings each may be plotted on a scale different from the actual scale for convenience of understanding. Also, in the drawings, the same reference sign is applied to the same member, and redundant description is omitted. In the following description, a main-scanning direction is a direction in which a deflecting unit optically scans a scanned surface. In this case, the main-scanning direction corresponds to a direction perpendicular to a rotation axis (or swinging motion axis) of the deflecting unit and an optical-axis direction. A sub-scanning direction is a direction intersecting with the main-scanning direction. In this case, the sub-scanning direction corresponds to a direction parallel to the rotation axis (or swinging motion axis) of the deflecting unit. Also, a main-scanning section is a cross-section including the optical axis and being parallel to the main-scanning direction. In this case, the main-scanning section is also a cross-section perpendicular to the sub-scanning direction. A sub-scanning section is a cross-section including the optical axis and being parallel to the sub-scanning direction. In this case, the sub-scanning section is also a cross-section perpendicular to the main-scanning direction.

FIG. 1 provides schematic illustrations of a primary portion of an optical scanning device 100 according to a first embodiment of the present invention. The left illustration in FIG. 1 schematically shows a main-scanning section of the optical scanning device 100. The right illustration in FIG. 1 schematically shows a sub-scanning section of a portion including an incident optical system L, a deflecting unit 5, and a light receiving unit 8 included in the optical scanning device 100. FIG. 1 illustrates only the chief rays of light beams while omitting marginal rays. Also, in the right illustration in FIG. 1, an optical path is developed so that the optical-axis direction of the incident optical system L is aligned with the optical-axis direction (X direction) of an imaging optical system 6 in the left illustration in FIG. 1.

The optical scanning device 100 according to this embodiment deflects light beams by the deflecting unit 5 and optically scans a scanned surface 7 in a main-scanning direction B. As the deflecting unit 5, a rotating polygon mirror (polygon mirror) having a plurality of deflecting surfaces (reflecting surfaces) 51 that rotate around the rotation axis is illustrated; however, instead of this, a swing mirror having one or two deflecting surfaces that swing around the swinging motion axis may be used. The deflecting unit 5 rotates at a constant speed (constant angular speed) in a direction indicated by arrow A by a driving unit (not shown) configured of a motor or the like.

As shown in the right illustration in FIG. 1, the incident optical system L according to this embodiment is an obliquely incident system that causes light beams to be obliquely incident (to be obliquely incident with respect to the main-scanning section) on each of the deflecting surfaces 51 of the deflecting unit 5 in the sub-scanning section. The incident optical system L according to this embodiment is configured of only a light source; however, the incident optical system L may include an optical element that guides light beams from the light source to the deflecting surface 51 and an aperture stop if required. Alternatively, the incident optical system L may guide light beams from a light source arranged outside the optical scanning device 100.

The light receiving unit 8 receives the light beams deflected by the deflecting surface 51 and generates a signal. On the basis of the signal generated by the light receiving unit 8, synchronous detection for determining a write-start position in the main-scanning direction on the scanned surface 7, and control for the light emitting quantity of the light source can be executed. The light receiving unit 8 according to this embodiment is configured of only a light receiving element such as a photoelectric conversion element; however, the light receiving unit 8 may include an optical element that guides light beams from the deflecting surface 51 to such a light receiving element and an aperture stop if required. In this embodiment, the light source and the light receiving element are mounted on the same substrate and hence a shift between relative positions of these members is restricted while the number of parts is decreased.

In the incident optical system L, the light beams emitted from the light source such as a semiconductor laser are incident on the deflecting surface 51 of the rotating deflecting unit 5. At a certain rotation angle, the light beams reflected by the deflecting surface 51 are incident on the light receiving unit 8, are photoelectrically converted, and generate a signal. As the deflecting unit 5 further rotates, the light beams reflected by the deflecting surface 51 are incident on the scanned surface 7 by the imaging optical system 6. Then, with the rotation of the deflecting unit 5, the light beams from the incident optical system L are deflected by the deflecting surface 51, and scan the scanned surface 7 in the main-scanning direction (Y direction). By using the signal generated at the light receiving unit 8, a timing at which optical scanning is started on the scanned surface 7, that is, a write-start position can be determined on the basis of the signal. Such synchronous detection is executed every single scanning on the scanned surface 7. Also, if optical scanning in the main-scanning direction is repeated while the scanned surface 7 is moved in the sub-scanning direction, the synchronous detection may be executed every several times of scanning.

In this case, it is assumed that $\alpha$ (deg) is an incident angle of the light beams from the incident optical system L with respect to the deflecting surface 51 in the sub-scanning section, and $\beta$ (deg) is an angle defined by the light beams incident on the deflecting surface 51 and the light beams deflected by the deflecting surface 51 and directed toward the light receiving unit 8 in the main-scanning section. Each of the angles is determined with reference to the chief rays of the light beams. At this time, the optical scanning device 100 according to this embodiment satisfies following Conditional Expression (1):

$$|\beta| \le |\alpha| \tag{1}$$

In the optical scanning device 100 according to this embodiment, since the incident optical system L is the obliquely incident system, the incident optical system L and the light receiving unit 8 can be arranged separately in the sub-scanning direction. Also, since aforementioned Conditional Expression (1) is satisfied, the incident optical system L and the light receiving unit 8 can be arranged closely in the main-scanning section. Accordingly, members, such as the light-beam separating element and the mirror, described in Japanese Patent Laid-Open No. 2009-115943 and Japanese Patent Laid-Open No. 2007-298997 are not required to be arranged in each optical path. That is, in the main-scanning section, the optical path between the incident optical system L and the deflecting surface, and the optical path between the deflecting surface and the light receiving unit 8 each are an optical path in which the chief rays of the light beams are not refracted or reflected. With such a simple configuration, synchronous detection with high accuracy and reduction in size of the entire device can be attained.

If Conditional Expression (1) is not satisfied, the space occupied by the incident optical system L and the light receiving unit 8 in the main-scanning section increases, and it is difficult to reduce the size of the entire device. To attain sufficient reduction in size of the entire device, at least one of following Conditional Expressions (2) and (3) is preferably satisfied:

$$1.5 \le |\alpha| \le 10 \tag{2), and}$$

$$0 \le |\beta| \le 5.0 \tag{3}$$

Further, the optical scanning device 100 according to this embodiment more preferably satisfies at least one of following Conditional Expressions (4) and (5):

$$1.5 \le |\alpha| \le 5.0 \tag{4), and}$$

$$0 \le |\beta| \le 3.0 \tag{5}$$

EXAMPLE 1

An optical scanning device 200 according to Example 1 of the present invention is described below in detail.

Figure 2:
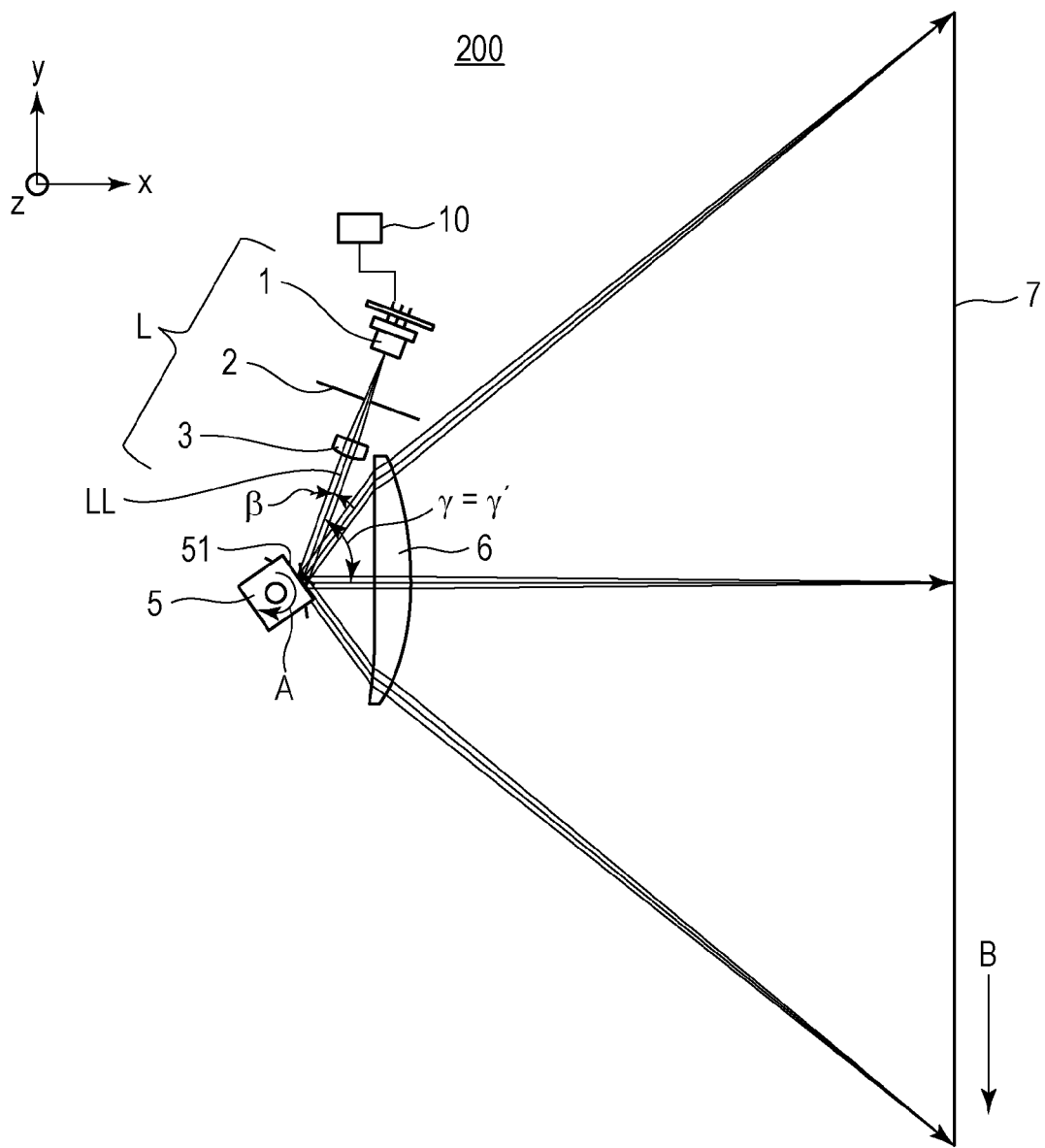
FIG. 2 is a main-scanning sectional view of an optical scanning device according to Example 1 of the present invention.
Figure 3:
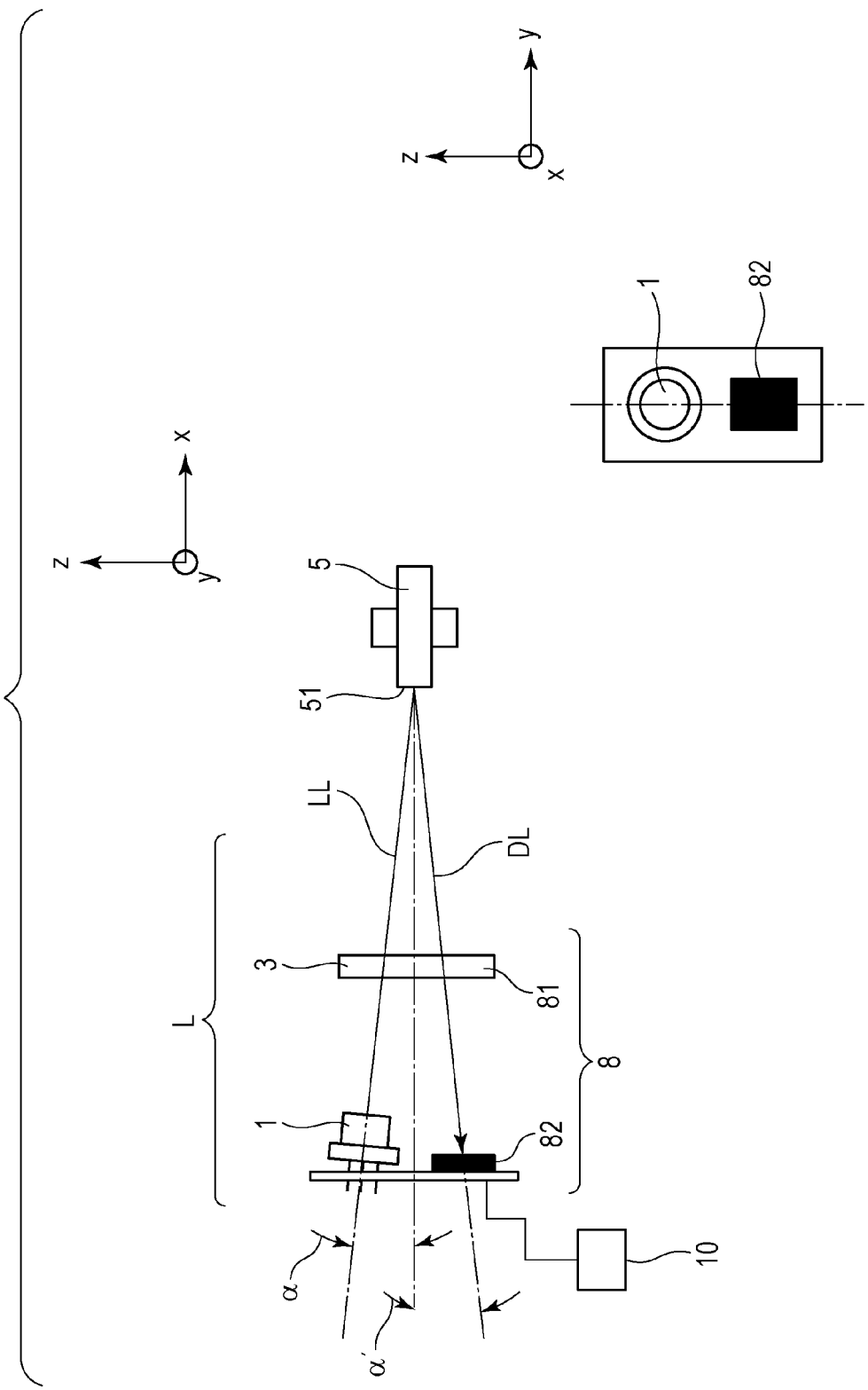
FIG. 3 provides schematic illustrations of primary portions of an incident optical system and a light receiving unit according to Example 1 of the present invention.

FIG. 2 is a main-scanning sectional view of the optical scanning device 200 according to this example. FIG. 3 provides schematic illustrations of primary portions of an incident optical system L and a light receiving unit 8 included in the optical scanning device 200. The left illustration in FIG. 3 schematically shows a sub-scanning section. The right illustration in FIG. 3 schematically shows a front surface of a module including a light source and a photoelectric conversion element. In FIG. 3, an optical path is developed so that the optical-axis direction of the incident optical system L is aligned with the optical-axis direction (X direction) of an imaging optical system 6 in FIG. 2. FIG. 3 illustrates only the chief rays of the light beams while omitting marginal rays.

The incident optical system L according to this example includes a light source 1 that emits light beams, an aperture stop 2 that regulates the light beams from the light source 1 and shapes the light beams, and a condenser lens (condensing optical system) 3 that converts the condensing state (convergence) of the light beams from the aperture stop 2. In this example, the light source 1 is a semiconductor laser, and the condenser lens 3 is an anamorphic lens having different refractive powers (powers) in the main-scanning section and the sub-scanning section. The condenser lens 3 converts divergent light beams emitted from the light source 1 and passing through the aperture stop 2 into parallel light beams or convergent light beams in the main-scanning section, and into convergent light beams in the sub-scanning section. The condenser lens 3 may be configured of two optical elements including a collimator lens and a cylinder lens, and the two optical elements may be integrated in this case.

A deflecting unit 5 according to this example is a rotating polygon mirror (polygon mirror) having a plurality of deflecting surfaces (reflecting surfaces) 51, and is rotated at a constant speed (constant angular speed) in a direction indicated by arrow A by a driving unit (not shown) configured of a motor or the like. The deflecting unit 5 deflects light beams guided by the incident optical system L by using each deflecting surface 51, and optically scans a scanned surface 7 in the main-scanning direction (direction indicated by arrow B). As the deflecting unit 5, for example, a swing mirror that swings at a constant speed may be employed instead of the rotating polygon mirror.

An imaging optical system 6 formed of an imaging lens (imaging optical element) having a condensing function and a fθ characteristic is arranged in the optical path from the deflecting unit 5 to the scanned surface 7. This imaging lens is an anamorphic lens formed of a plastic (resin) material or the like, and has a positive power on the optical axis in the main-scanning section and the sub-scanning section. The imaging optical system 6 guides and condenses the light beams deflected by the deflecting unit 5 onto the scanned surface 7, and forms a spot image. The spot image moves at a constant speed on the scanned surface 7 due to the fθ characteristic. The imaging optical system 6 brings the deflecting surface 51 and the scanned surface 7 into a conjugate relationship in the sub-scanning section, and hence executes optical face tangle error compensation for the deflecting surface 51.

Table 1 shows respective numerical values for optical arrangement and so forth of the imaging optical system according to this example.

TABLE 1

| Imaging optical system data | | | |
|---|---|---|---|
| fθ coefficient | [mm/rad] | f | 114.5 |
| Light source wavelength | [nm] | λ | 790 |
| Imaging lens refractive index | | N | 1.52390 |
| Maximum deflection angle | [deg] | θmax | ±53.6 |
| Deflection point to imaging lens incident surface | [mm] | D1 | 14.0 |
| Imaging lens incident surface to imaging lens exit surface | [mm] | D2 | 6.8 |
| Imaging lens exit surface to scanned surface | [mm] | D5 | 104.2 |
| Deflection point to scanned surface | [mm] | D | 125.0 |
| Effective scanning line | [mm] | W | 214 |
| Imaging lens incident surface sub-scanning direction shift amount | [mm] | | 0.36 |
| Imaging lens exit surface sub-scanning direction shift amount | [mm] | | 0.51 |
| Number of surfaces in polygon mirror | [surface] | | 4 |
| Polygon mirror circumscribed circle diameter | [φ] | | 14 |

The shapes (meridional shapes) in the main-scanning section including the surface vertex of respective lens surfaces (incident surface and exit surface) of the imaging lens according to this example are aspheric surfaces that can be expressed as functions to 12-th order. To be specific, when an intersection between each lens surface and the optical axis is an origin, the axis in the optical-axis direction is an X-axis, and the axis orthogonal to the optical axis in the main-scanning surface is a Y-axis, the meridional shape of each lens surface is expressed by following Expression (6):

$$X = \frac{Y^2/R}{1 + (1 - (1+K)(Y/R)^2)^{1/2}} + B_4Y^4 + B_6Y^6 + B_8Y^8 + B_{10}Y^{10} + B_{12}Y^{12}. \tag{6}$$

In this expression, R is a curvature radius in the main-scanning section on the optical axis (meridional curvature radius), and K, $B_4$, $B_6$, $B_8$, $B_{10}$, and $B_{12}$ are aspheric surface coefficients in the main-scanning section. Also, the shape of each lens surface in the sub-scanning section (sagittal shape) at each position in the main-scanning direction is expressed by following Expression (7) and Expression (8):

$$S = \frac{Z^2/r'}{1 + (1 - (Z/r')^2)^{1/2}} + \Sigma\Sigma M_{j\_k}Y^jZ^k \text{ and} \tag{7}$$

$$1/r' = 1/r + D_2Y^2 + D_4Y^4 + D_6Y^6 + D_8Y^8 + D_{10}Y^{10} + D_{12}Y^{12} \ldots. \tag{8}$$

In the expressions, r is a curvature radius in the sub-scanning section on the optical axis (sagittal curvature radius), $D_2$, $D_4$, $D_6$, $D_8$, $D_{10}$, and $D_{12}$ are sagittal change coefficients, r' is a sagittal curvature radius at the position of an image height Y, and $M_{j\_k}$ is an aspheric surface coefficient in the sub-scanning section. For example, $M_{j\_1}$ is the first term of Z, representing an inclination of the lens surface in the sub-scanning section (sagittal tilt). In this example, the sagittal tilt amount is changed in the main-scanning direction by using coefficients of 0-th, 2-nd, 4-th, 6-th, 8-th, and 10-th orders.

Table 2 shows shape data for respective lens surfaces of the imaging lens according to this example. Referring to each coefficient in Table 2, a subscript u indicates the same side as the light source 1 (upper side) with respect to each lens surface vertex (that is, the optical axis) of the imaging lens, and a subscript l indicates the opposite side to the light source 1 (lower side) with respect to each lens surface vertex of the imaging lens. A coefficient without the subscript u or l is a coefficient common to the upper side and the lower side.

TABLE 2

Imaging lens shape data

| | | Imaging lens | |
|---|---|---|---|
| | | Incident surface | Exit surface |
| Main-scanning section | R | 130.29 | −95.31 |
| | K | | |
| | B4u | −2.10E−05 | −7.42E−06 |
| | B6u | 5.00E−08 | −3.00E−09 |
| | B8u | −6.41E−11 | 2.65E−11 |
| | B10u | 3.91E−14 | −2.90E−14 |
| | B12u | −5.49E−18 | 1.01E−17 |
| | B4l | −2.67E−05 | −1.25E−05 |
| | B6l | 5.29E−08 | 2.29E−09 |
| | B8l | −4.29E−11 | 5.86E−12 |
| | B10l | −4.19E−16 | 1.96E−14 |
| | B12l | 1.11E−17 | −2.78E−17 |
| Sub-scanning section | r | −15.36 | −6.45 |
| | D2u | −2.28E−03 | 4.61E−04 |
| | D4u | 7.01E−06 | −3.87E−06 |
| | D6u | −8.15E−09 | 6.93E−09 |
| | D8u | −1.14E−12 | −2.82E−12 |
| | D10u | 1.23E−14 | −1.18E−15 |
| | D12u | −1.68E−17 | −3.57E−18 |
| | D2l | 3.46E−03 | 1.09E−03 |
| | D4l | 5.80E−06 | −2.80E−06 |
| | D6l | −1.12E−07 | −3.43E−09 |
| | D8l | 2.93E−10 | 9.19E−12 |
| | D10l | −1.93E−13 | 4.45E−15 |
| | D12l | −1.28E−16 | −1.85E−17 |
| | M0_1u | 2.54E−03 | −3.41E−02 |
| | M2_1u | 8.24E−05 | 5.86E−05 |
| | M4_1u | 2.16E−07 | 2.96E−08 |
| | M6_1u | −4.69E−09 | −2.74E−10 |
| | M8_1u | 1.05E−11 | −2.41E−12 |
| | M10_1u | −7.19E−15 | 3.26E−02 |
| | M0_1l | 2.54E−03 | −3.41E−02 |
| | M2_1l | 2.25E−04 | 1.40E−04 |
| | M4_1l | −1.77E−06 | −5.14E−07 |
| | M6_1l | 6.93E−09 | 8.49E−10 |
| | M8_1l | −1.50E−11 | −7.88E−13 |
| | M10_1l | 1.26-14 | −3.84E−16 |

Next, configurations of the incident optical system L and the light receiving unit 8 according to this example are described in detail.

The light receiving unit 8 functions as a synchronous detection unit that receives light beams deflected by the deflecting surface 51, and generates a synchronous signal for determining a write-start position in the main-scanning direction on the scanned surface 7. The light receiving unit 8 includes a synchronous detection lens (synchronous detection optical element) 81 that guides and condenses light beams DL for synchronous detection deflected by the deflecting surface 51, and a synchronous detection sensor (photoelectric conversion element) 82 that receives the light beams from the synchronous detection lens 81 and outputs a synchronous signal.

Figure 4:
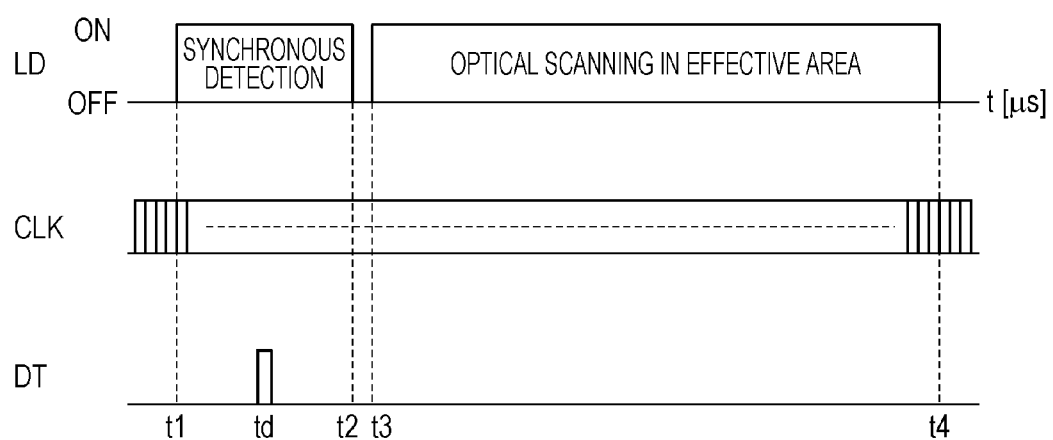
FIG. 4 is an illustration showing a light emitting timing of a light source according to Example 1 of the present invention.

The synchronous signal output from the sensor 82 is input to a control circuit (driver) 10 shown in FIGS. 2 and 3. The control circuit 10 determines a write-start position in the main-scanning direction on the scanned surface 7 on the basis of this synchronous signal. FIG. 4 is a timing chart showing the light emitting timing of the light source 1 while the deflecting unit 5 rotates by one turn. LD represents the ON/OFF state of the light source, CLK represents a clock signal, and DT represents an output signal of the sensor.

By the control circuit 10, the light source 1 starts emitting light at a time t1, and temporarily stops emitting light at a time t2. During this period, when the light beams from the light source 1 are reflected by the deflecting surface 51 and incident on the sensor 82, a synchronous signal is generated at a time td. The control circuit counts clock pulses CLK from the time td, and brings the light source 1 into a light-emission available state (time t3) if the counted number reaches a predetermined value. The period of time required for optical scanning in an effective area on the scanned surface 7 is previously determined (from time t3 to time t4). Hence, the light source 1 is turned on or off in accordance with image data during this period, and exposes the scanned surface 7 to light with a pattern corresponding to image data for one line.

In this way, the write-start timing in the main-scanning direction is determined on the basis of the synchronous signal. Accordingly, even if scanning is repeated, reproducibility of the write-start position is held. In this example, an operation of executing the synchronous detection and determining the write-start timing is repeated every single optical scanning on the scanned surface 7.

Table 3 shows respective numerical values for optical arrangement and so forth of the incident optical system L. Table 4 shows respective numerical values for optical arrangement and so forth of the light receiving unit 8.

TABLE 3

Incident optical system data

| Incident angle in main-scanning section | [deg] | γ | 70 |
|---|---|---|---|
| Incident angle in sub-scanning section | [deg] | α | 3 |
| Condenser lens main-scanning curvature radius | [mm] | R1 | 0 |
| | [mm] | R2 | −10.775 |
| Condenser lens sub-scanning curvature radius | [mm] | R1 | 0 |
| | [mm] | R2 | −5.965 |
| Condenser lens refractive index | | Ncol | 1.52390 |
| Light source to aperture stop | [mm] | d1 | 10.03 |
| Aperture stop to condenser lens incident surface | [mm] | d2 | 11.3 |
| Condenser lens incident surface to condenser lens exit surface | [mm] | d3 | 3 |
| Condenser lens exit surface to deflecting surface | [mm] | d4 | 22.67 |

TABLE 4

Light receiving unit data

| Incident angle in main-scanning section | [deg] | γ' | 70 |
|---|---|---|---|
| Incident angle in sub-scanning section | [deg] | α' | −3 |
| Synchronous detection lens main-scanning curvature radius | [mm] | R1 | 10.463 |
| | [mm] | R2 | 0 |
| Synchronous detection lens sub-scanning curvature radius | [mm] | R1 | 5.679 |
| | [mm] | R2 | 0 |
| Synchronous detection lens refractive index | | Nbd | 1.52390 |
| Deflecting surface to synchronous detection lens incident surface | [mm] | d1 | 24.37 |
| Synchronous detection lens incident surface to synchronous detection lens exit surface | [mm] | d2 | 3 |
| Synchronous detection lens exit surface to synchronous detection sensor surface | [mm] | d3 | 18.33 |

In Table 3, "incident angle γ in main-scanning section" indicates an angle defined by the chief ray emitted from the incident optical system L and being incident on the deflecting surface 51 and the optical axis of the imaging optical system 6 in the main-scanning section. Also, "incident angle γ' in main-scanning section" and "incident angle α' in sub-scanning section" in Table 4 each indicate an angle defined by the chief ray deflected by the deflecting surface 51 and directed toward the light receiving unit 8 and the optical axis of the imaging optical system 6 in each of the main-scanning section and the sub-scanning section. In this example, γ=γ' and α=−α'.

As shown in the left illustration in FIG. 3, incident light beams LL guided to the deflecting surface 51 of the deflecting unit 5 by the incident optical system L are deflected toward the incident optical system L when the deflecting surface 51 has a specific deflection angle in the main-scanning section. In this case, since the incident optical system L causes the incident light beams LL to be obliquely incident at an incident angle of 3° with respect to the deflecting surface 51 in the sub-scanning section, the incident light beams LL incident on the deflecting surface 51 do not return to the incident optical system L but are deflected downward. In this example, since the incident optical system L and the light receiving unit 8 are arranged in the sub-scanning direction to have the same incident angle in the main-scanning section, the light beams deflected by the deflecting surface 51 are incident on the light receiving unit 8, as synchronous detection light beams DL.

As described above, in this example, since the incident optical system L is the obliquely incident system, the incident optical system L and the light receiving unit 8 can be arranged side by side in the sub-scanning direction. In this example, since α=3° and β=0°, aforementioned Conditional Expressions (1) to (5) are satisfied. Accordingly, in the main-scanning section, the space for arranging the light receiving unit 8 can be decreased, the scanning field angle of the deflecting unit 5 can be consequently increased, and the distance between the imaging optical system 6 and the scanned surface 7 can be decreased.

In particular, with the configuration in which the incident light beams LL are aligned with the synchronous detection light beams DL in the main-scanning section like this example, the entire device can be further sufficiently reduced in size. The expression "aligned" includes not only strict alignment between both the chief rays of the incident light beams LL and the synchronous detection light beams DL in the main-scanning section, but also "substantial alignment" such as when both the light beams overlap each other over the entire optical path. However, the chief rays of both the incident light beams LL and the synchronous detection light beams DL are desirably aligned with each other.

Also, by employing the above-described configuration, the incident optical system L and the light receiving unit 8 can be arranged at positions closer to the imaging optical system 6. Accordingly, an error between the effective light beams that optically scan the effective area on the scanned surface 7 and the light beams DL for synchronous detection can be decreased, and hence the synchronous detection can be executed with higher accuracy. At this time, the light beams DL are not required to be detected through the imaging optical system 6 unlike the configuration described in Japanese Patent Laid-Open No. 2007-298997, the imaging optical system 6 can be reduced in size.

In this example, the condenser lens 3 (first optical element) and the synchronous detection lens 81 (second optical element) are integrally formed (integrated) for decreasing the number of parts. However, these lenses may be separated from each other and arranged if required. Also, in this example, by mounting the light source 1 and the sensor 82 on the same substrate, a shift between relative positions of these members is restricted while the number of parts is decreased. If this configuration is employed, the optical path length from the light source 1 to the deflecting surface 51 is substantially the same as the optical path length from the deflecting surface 51 to the synchronous detection sensor 82.

In this example, since the optical path length from the light source 1 to the deflecting surface 51 is 47 mm, the separate distance between the centers of the light source 1 and the synchronous detection sensor 82 in the sub-scanning direction is (47 mm×sin(3°))×2=4.9 mm. In the right illustration in FIG. 3, the light source 1 has a circular shape with a diameter of 4 mm, and the sensor 82 has a rectangular shape with a length in the main-scanning direction of 3 mm and a length in the sub-scanning direction of 4 mm. Hence, even if the incident optical system L and the light receiving unit 8 have the same incident angle in the main-scanning section, interference between the light source 1 and the sensor 82 is not generated.

In this example, in the main-scanning section, a member that refracts the chief rays of light beams or a member that reflects the chief rays of light beams is not arranged in the optical path from the incident optical system L (light source 1) to the deflecting surface 51 or the optical path from the deflecting surface 51 to the light receiving unit 8 (sensor 82). That is, since the light-beam separating element or the mirror described in Japanese Patent Laid-Open No. 2009-115943 and Japanese Patent Laid-Open No. 2007-298997 is not arranged, the influence of, for example, an arrangement error of these members is no longer provided, and the space for arranging respective members not to interfere with each other is no longer required.

With the optical scanning device 200 according to this example, synchronous detection with high accuracy and reduction in size can be provided with a simple configuration.

EXAMPLE 2

An optical scanning device 300 according to Example 2 of the present invention is described below in detail. The optical scanning device 300 according to this example differs from the optical scanning device 200 according to Example 1 in that light beams emitted from two light sources respectively optically scan mutually different two scanned surfaces.

Figure 5:
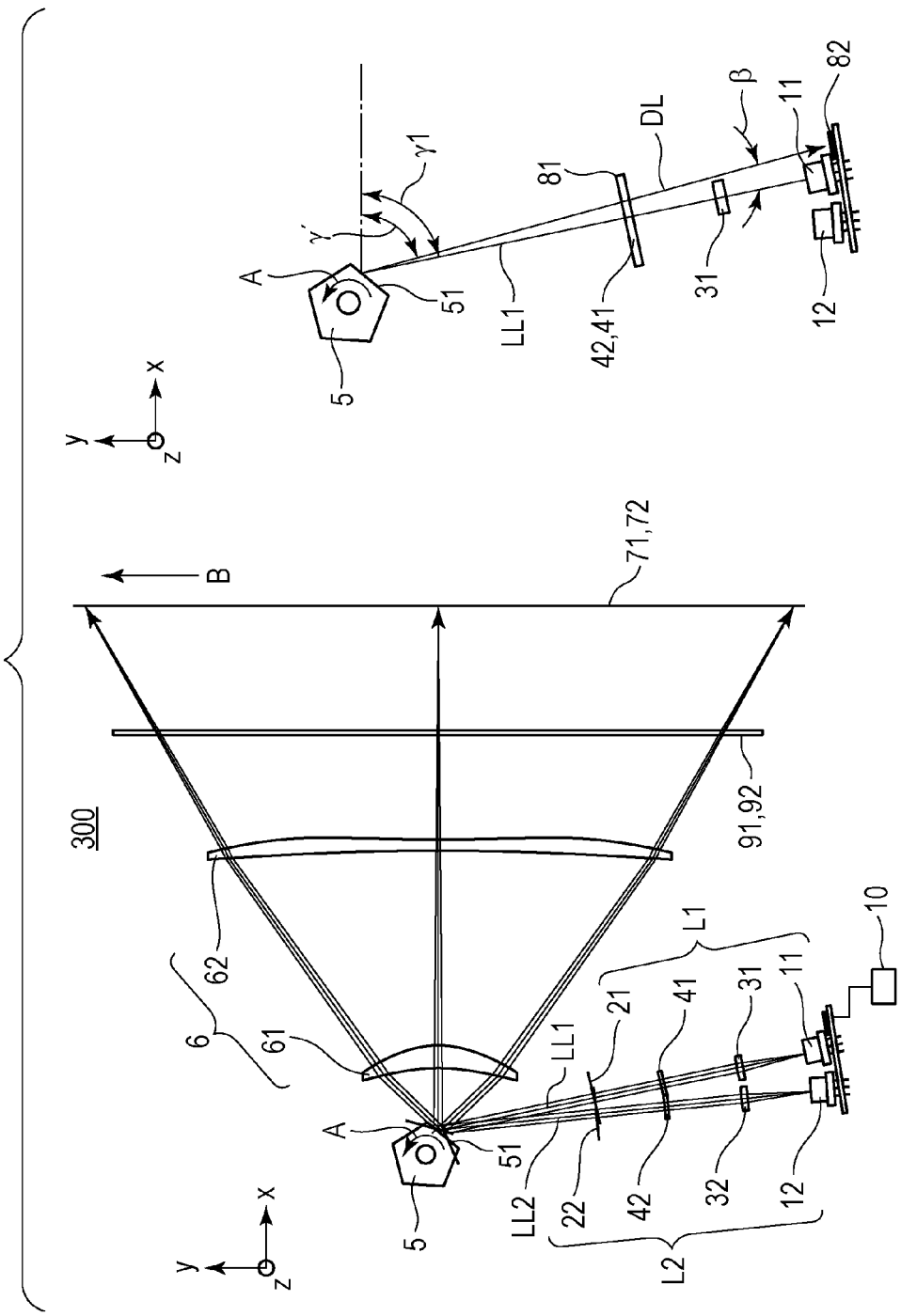
FIG. 5 provides main-scanning sectional views of an optical scanning device according to Example 2 of the present invention.
Figure 6:
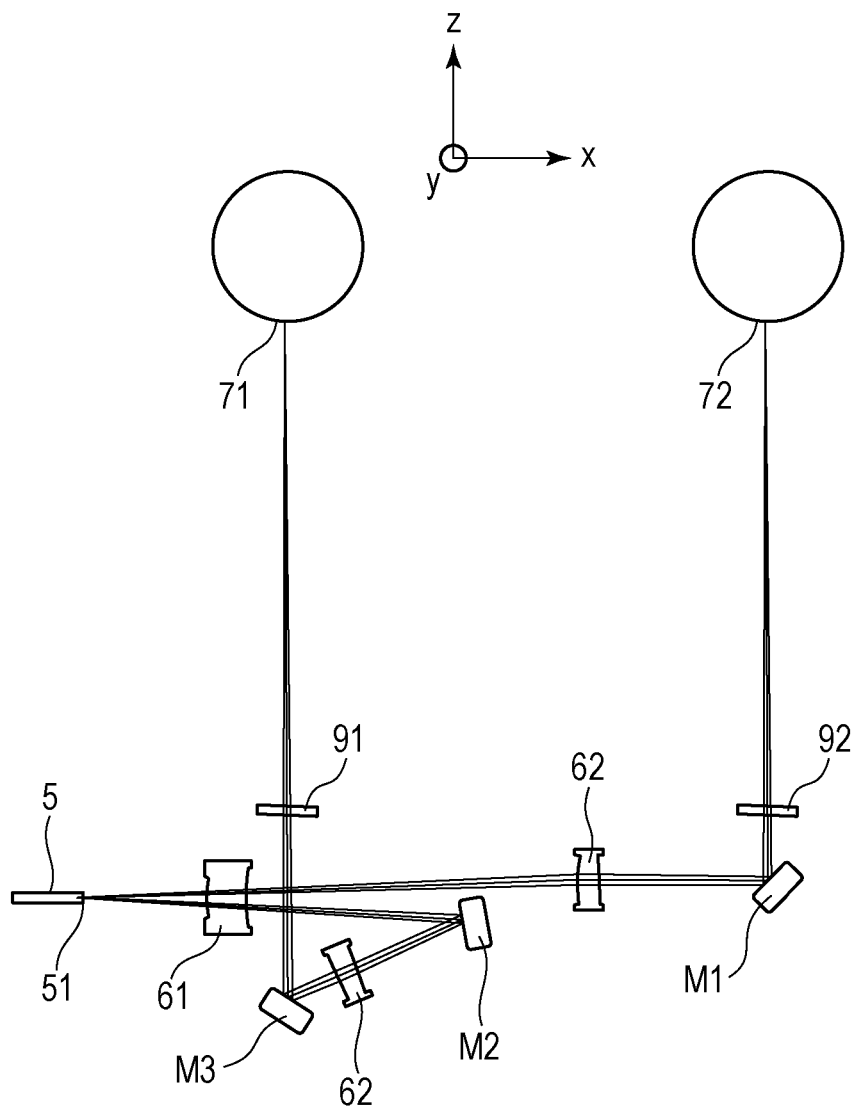
FIG. 6 is a sub-scanning sectional view of the optical scanning device according to Example 2 of the present invention.

The left illustration in FIG. 5 shows a main-scanning section of the optical scanning device 300 according to this example. The right illustration in FIG. 5 schematically shows incident optical systems L1 and L2, and a light receiving unit 8 in an enlarged manner. Also, FIG. 6 schematically shows a sub-scanning section of the optical scanning device 300. In the left illustration of FIG. 5, reflecting members M1 to M3 in respective paths from a deflecting surface 51 to scanned surfaces 71 and 72 are omitted, and respective optical paths are developed. Also, in the right illustration in FIG. 5, light rays other than the chief ray emitted from a light source 11 and part of members are omitted.

In this example, the first incident optical system L1 and the second incident optical system L2 guide light beams respectively corresponding to the first scanned surface 71 and the second scanned surface 72 being mutually different from each other, to the same deflecting surface 51. The first incident optical system L1 includes a light source 11, a collimator lens 31, a cylinder lens 41, and an aperture stop 21. The second incident optical system L2 includes a light source 12, a collimator lens 32, a cylinder lens 42, and an aperture stop 22. In this example, the cylinder lenses 41 and 42 are integrated; however, these may be separately arranged if required. Also, the collimator lenses 31 and 32 may be integrated.

In this example, the light sources 11 and 12 are semiconductor lasers. The collimator lenses 31 and 32 each have the same refractive power in the main-scanning section and the sub-scanning section. The collimator lenses 31 and 32 convert divergent light beams emitted from the light sources 11 and 12 into parallel light beams in the main-scanning section and the sub-scanning section. The cylinder lenses 41 and 42 respectively convert the light beams emitted from the collimator lenses 31 and 32 into convergent light beams in the sub-scanning section. Also, the aperture stops 21 and 22 respectively regulate the light beams emitted from the cylinder lenses 41 and 42, and shape the light beams.

An imaging optical system 6 according to this example differs from Example 1 in that the imaging optical system 6 includes a first imaging lens 61 and a second imaging lens 62 in respective optical paths from the deflecting surface 51 to the scanned surfaces 71 and 72. In this example, the first imaging lens 61 is integrated (shared) in the respective optical paths. The imaging lenses 61 and 62 are anamorphic lenses formed of the same plastic material. The first imaging lens 61 has a positive power in the main-scanning section but does not have a power in the sub-scanning section on the optical axis. Also, the second imaging lens 62 has a negative power in the main-scanning section and has a positive power in the sub-scanning section on the optical axis.

The reflecting members M1 to M3 that bend light beams and guide the light beams to the corresponding scanned surfaces, and dustproof glasses 91 and 92 for preventing dust from entering the optical scanning device 300 are arranged between the first imaging lens 61 and the scanned surfaces 71 and 72. The number and arrangement of the reflecting members in the respective optical paths are not limited to those shown in FIG. 6. Alternatively, the first imaging lens 61 may be separated into two sections and may be arranged in the respective optical paths, and the second imaging lenses 62 may be integrated in the respective optical paths if required.

In the optical scanning device 300 according to this example, light beams from the first incident optical system L1 and the second incident optical system L2 are reflected at the same position on the same deflecting surface 51, and are simultaneously incident at positions mutually corresponding to the scanned surfaces 71 and 72 in the main-scanning direction. That is, the write-start timings with the light beams emitted from the light sources 11 and 12 are the same. However, the light beams may be incident at different incident positions on the deflecting surface 51, or the write-start timings on the respective scanned surfaces may be different if required.

Similarly to Example 1, Table 5 shows respective numerical values for optical arrangement and so forth of the imaging optical systems according to this example, and Table 6 shows lens surface shapes of the imaging lenses according to this example. The respective values shown in Table 5 are common to the two optical paths. Also, the lens surface shape of each of the imaging lenses 61 and 62 is expressed by the same definition expression as that shown in Example 1.

TABLE 5

| Imaging optical system data | | | |
|---|---|---|---|
| fθ coefficient | [mm/rad] | f | 185 |
| Light source wavelength | [nm] | λ | 793 |
| Imaging lens refractive index | | N | 1.52390 |
| Maximum deflection angle | [deg] | θmax | ±45.8 |

TABLE 5-continued

| Imaging optical system data | | | |
|---|---|---|---|
| Deflection point to imaging lens 61 incident surface | [mm] | D1 | 27.5 |
| Imaging lens 61 incident surface to imaging lens 61 exit surface | [mm] | D2 | 10 |
| Imaging lens 61 exit surface to imaging lens 62 incident surface | [mm] | D3 | 86.0 |
| Imaging lens 62 incident surface to imaging lens 62 exit surface | [mm] | D4 | 5.0 |
| Imaging lens 62 exit surface to scanned surface | [mm] | D5 | 103.5 |
| Deflection point to scanned surface | [mm] | D | 232.0 |
| Effective scanning line | [mm] | W | 312 |
| Imaging lens 62 incident surface sub-scanning direction shift amount | [mm] | | 3.64 |
| Imaging lens 62 exit surface sub-scanning direction shift amount | [mm] | | 3.64 |
| Number of surfaces in polygon mirror | [surface] | | 5 |
| Polygon mirror circumscribed circle diameter | [φ] | | 34 |

TABLE 6

| | | Imaging lens 61 | | Imaging lens 62 | |
|---|---|---|---|---|---|
| | | Incident surface | Exit surface | Incident surface | Exit surface |
| Main-scanning section | R | −97.36 | −47.61 | −1334.56 | 619.31 |
| | K | 1.50E+04 | 2.25E+05 | | −3.42E+02 |
| | B4u | −1.58E−06 | −2.38E−06 | | −1.42E−07 |
| | B6u | 2.45E−09 | 1.09E−09 | | 7.05E−12 |
| | B8u | −1.70E−12 | 1.12E−13 | | −2.96E−16 |
| | B10u | 4.14E−16 | −2.60E−16 | | 6.23E−21 |
| | B4l | −1.58E−06 | −2.38E−06 | | −1.42E−07 |
| | B6l | 2.45E−09 | 1.09E−09 | | 7.05E−12 |
| | B8l | −1.70E−12 | 1.12E−13 | | −2.96E−16 |
| | B10l | 4.14E−16 | −2.60E−16 | | 6.23E−21 |
| Sub-scanning section | r | 30 | 30 | 48.32 | −72.55 |
| | D2u | | −3.97E−04 | | 1.29E−04 |
| | D4u | | 7.31E−07 | | −3.19E−09 |
| | D6u | | −1.63E−09 | | 1.96E−12 |
| | D8u | | 1.93E−12 | | −1.89E−16 |
| | D10u | | −8.36E−16 | | 1.30E−20 |
| | D2l | | −3.89E−04 | | 1.25E−04 |
| | D4l | | 2.80E−07 | | 1.93E−09 |
| | D6l | | −2.59E−10 | | −3.16E−13 |
| | D8l | | 3.49E−13 | | 9.85E−17 |
| | D10l | | −1.99E−16 | | −3.00E−22 |
| | M0_1u | | | | −6.64E−03 |
| | M2_1u | | | | 5.67E−07 |
| | M4_1u | | | | −5.42E−11 |
| | M6_1u | | | | 3.81E−15 |
| | M8_1u | | | | |
| | M10_1u | | | | |
| | M0_1l | | | | −6.64E−03 |
| | M2_1l | | | | 1.17E−07 |
| | M4_1l | | | | 4.23E−11 |
| | M6_1l | | | | −2.21E−15 |
| | M8_1l | | | | |
| | M10_1l | | | | |

Figure 7:
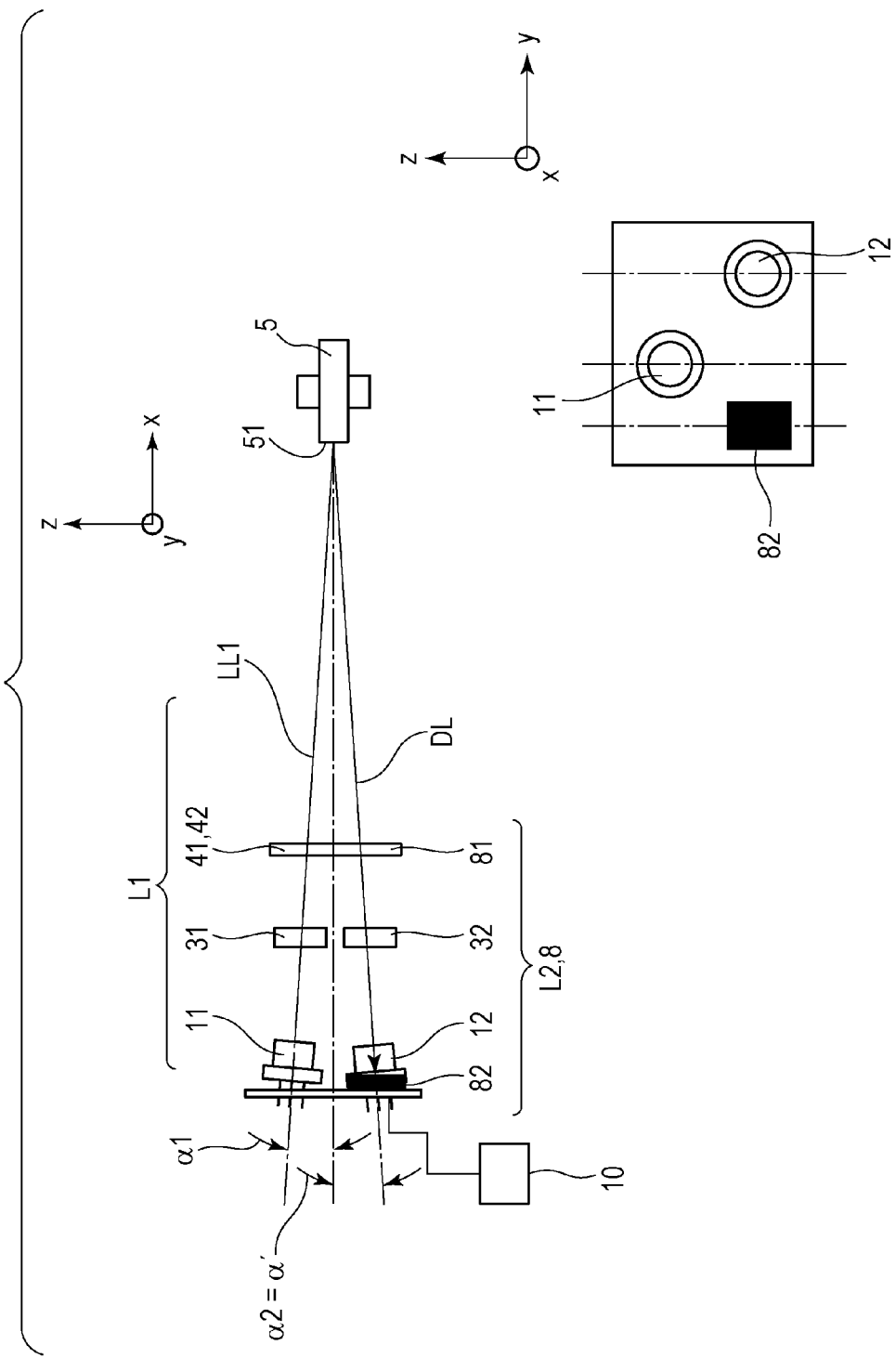
FIG. 7 provides schematic illustrations of primary portions of an incident optical system and a light receiving unit according to Example 2 of the present invention.

Next, configurations of the incident optical systems L1 and L2 and the light receiving unit 8 according to this example are described in detail. FIG. 7 provides schematic illustrations of primary portions of the incident optical systems L1 and L2, and the light receiving unit 8. The left illustration in FIG. 7 schematically shows a sub-scanning section. The right illustration in FIG. 7 schematically shows a front surface of a module including the light sources and the photoelectric conversion element. Similarly to Example 1, Table 7 shows respective numerical values for optical arrangement and so forth of the incident optical systems L1 and L2, and Table 8 shows respective numerical values for optical arrangement and so forth of the light receiving unit 8. The respective values shown in Table 7 are common to the incident optical systems L1 and L2 except for the incident angle in each section.

TABLE 7

Incident optical system

|  |  |  | Incident optical system L1 | Incident optical system L2 |
|---|---|---|---|---|
| Incident angle in main-scanning section | [deg] | γ1, γ2 | 78 | 84 |
| Incident angle in sub-scanning section | [deg] | α1, α2 | 2.2 | −2.2 |
| Collimator lens curvature radius | [mm] | R1 | 0 | |
|  | [mm] | R2 | −22.927 | |
| Collimator lens refractive index |  | NcoI | 1.51046 | |
| Cylinder lens curvature radius | [mm] | r1 | 51.9 | |
|  | [mm] | r2 | 0 | |
| Cylinder lens refractive index |  | NcyI | 1.52390 | |
| Light source to collimator lens incident surface | [mm] | d1 | 28.455 | |
| Collimator lens incident surface to collimator lens exit surface | [mm] | d2 | 3 | |
| Collimator lens exit surface to cylinder lens incident surface | [mm] | d3 | 32.545 | |
| Cylinder lens incident surface to cylinder lens exit surface | [mm] | d4 | 2 | |
| Cylinder lens exit surface to aperture stop | [mm] | d5 | 30 | |
| Aperture stop to deflecting surface | [mm] | d6 | 70.0 | |

TABLE 8

Light receiving unit data

| Incident angle in main-scanning section | [deg] | γ' | 76.5 |
|---|---|---|---|
| Incident angle in sub-scanning section | [deg] | α' | −2.2 |
| Synchronous detection lens main-scanning curvature radius | [mm] | R1 | 36.225 |
|  | [mm] | R2 | 0 |
| Synchronous detection lens sub-scanning curvature radius | [mm] | R1 | 20.761 |
|  | [mm] | R2 | 0 |
| Synchronous detection lens refractive index |  | Nbd | 1.52390 |
| Deflecting surface to synchronous detection lens incident surface | [mm] | d1 | 96 |
| Synchronous detection lens incident surface to synchronous detection lens exit surface | [mm] | d2 | 2 |
| Synchronous detection lens exit surface to synchronous detection sensor surface | [mm] | d3 | 68 |

The incident optical systems L1 and L2 according to this example each cause light beams to be obliquely incident with respect to the deflecting surface 51 in the sub-scanning section at an incident angle of ±2.2°. Accordingly, the light beams emitted from the incident optical systems L1 and L2 are separated from each other and guided, and the light beams respectively optically scan the mutually different scanned surfaces 71 and 72. At this time, like this example, with the configuration in which the absolute values of the incident angles in the sub-scanning section of the incident optical systems L1 and L2 are the same, the same optical members can be employed in the respective optical paths. Also, the incident optical systems L1 and L2 cause the light beams to be obliquely incident at 78° and 84° in the main-scanning section with respect to the deflecting surface 51.

In this way, by arranging the incident optical systems L1 and L2 to have different incident angles in the main-scanning section, as shown in FIG. 7, the distance in the sub-scanning direction can be decreased while interference between the light source 11 and the light source 12 is avoided. Also, with this configuration, the incident angles in the sub-scanning section of the incident optical systems L1 and L2 can be minimized. Even if variation is generated in decentering and tilting of each deflecting surface of the deflecting unit 5, pitch variation of scanning lines can be prevented from being generated on the scanned surface.

As shown in the right illustration in FIG. 5 and the left illustration in FIG. 7, light beams LL1 guided by the incident optical system L1 to the deflecting surface 51 of the deflecting unit 5 are incident as light beams DL at a certain deflection angle on the light receiving unit 8. At this time, since the incident optical system L1 is the obliquely incident system in the sub-scanning section, the incident optical system L1 and the light receiving unit 8 can be closely arranged. To be specific, in this example, since α=2.2° and β=1.5°, aforementioned Conditional Expressions (1) to (5) are satisfied. Accordingly, in the main-scanning section, the space for arranging the light receiving unit 8 can be decreased.

Also, in this example, the incident angle in the main-scanning section of the incident optical system L1 is 78°, and the incident angle in the main-scanning section of the light receiving unit 8 is 76.5°. As shown in FIG. 5, the sensor 82 is arranged at the downstream side of scanning (downstream side in a rotation direction of the deflecting unit 5) with respect to the light source 11. Accordingly, as compared with a case in which the sensor 82 is arranged upstream of the light source 11, synchronous detection can be executed at a position closer to the write-start position in the main-scanning direction on the scanned surface, and hence a detection error can be decreased. Also, the light beams DL can be prevented from being blocked by the deflecting surface 51.

In this example, the optical path length from the light source 11 to the deflecting surface 51 is 166 mm. Hence, the separate distance between the centers of the light source 11 and the synchronous detection sensor 82 in the sub-scanning direction is $\sqrt{(((166 \text{ mm} \times \sin(2.2°)) \times 2)^2 + (166 \text{ mm} \times \sin(1.5°))^2))} = 13.5$ mm. Since the sizes of the light source 11 and the sensor 82 are the same as those in Example 1, interference between the light source 12 and the sensor 82 does not occur as shown in the right illustration in FIG. 7.

Similarly to Example 1, the light source 12 and the sensor 82 may be arranged side by side in the sub-scanning direction so that the incident optical system L2 and the light receiving unit 8 have the same incident angle in the main-scanning section if required. In this example, to decrease the number of parts, the cylinder lenses 41 and 42, and the synchronous detection lens 81 are integrally formed; however, these members may be separated and arranged if required.

In this example, the write-start timing on each of the first scanned surface 71 and the second scanned surface 72 is determined on the basis of a synchronous signal generated when the light receiving unit 8 receives the light beams from the light source 11; however, it is not limited thereto. For example, the write-start timing on each scanned surface may be determined on the basis of a synchronous signal generated when the light receiving unit 8 receives the light beams from the light source 12. Alternatively, the write-start timings on the corresponding scanned surfaces may be determined on the basis of respective synchronous signals generated when the light receiving unit 8 receives the light beams from the light source 11 and the light source 12.

Also, in the optical scanning device 300 according to this embodiment, another set of the respective members shown in the left illustration in FIG. 5 and FIG. 6 except the deflecting unit 5 may be arranged at the opposite side with respect to the deflecting unit 5 (opposed arrangement). Accordingly, a tandem-type optical scanning device can be configured in which a single deflecting surface 51 optically scans two scanned surfaces and at the same time another deflecting surface optically scans other two scanned surfaces. At this time, write-start timings on the four scanned surfaces can be determined on the basis of a synchronous signal generated when the light receiving unit 8 receives light beams from at least one of the four light sources.

Figure 8:
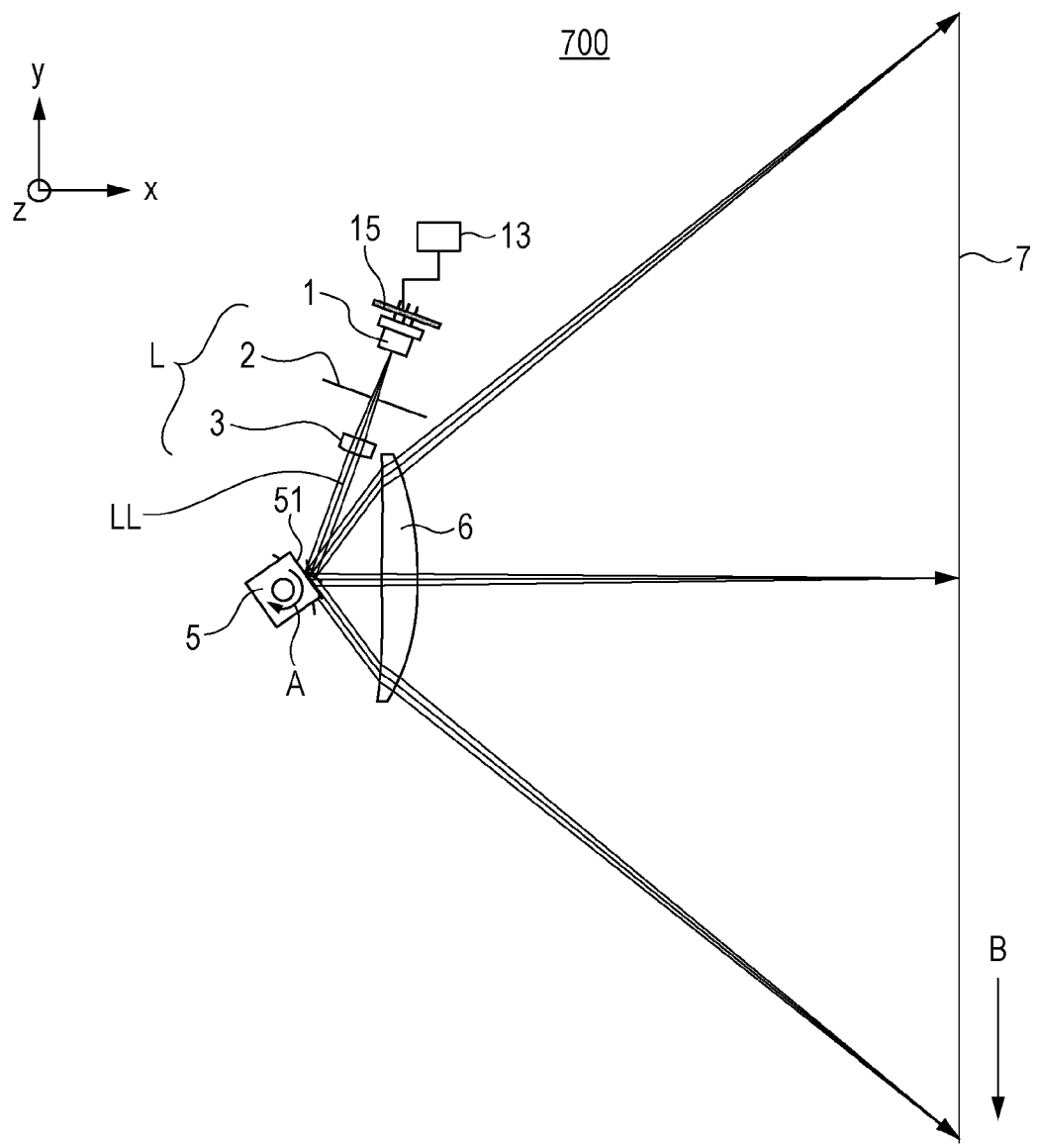
FIG. 8 is a main-scanning sectional view of an optical scanning device according to a second embodiment of the present invention.
Figure 9:
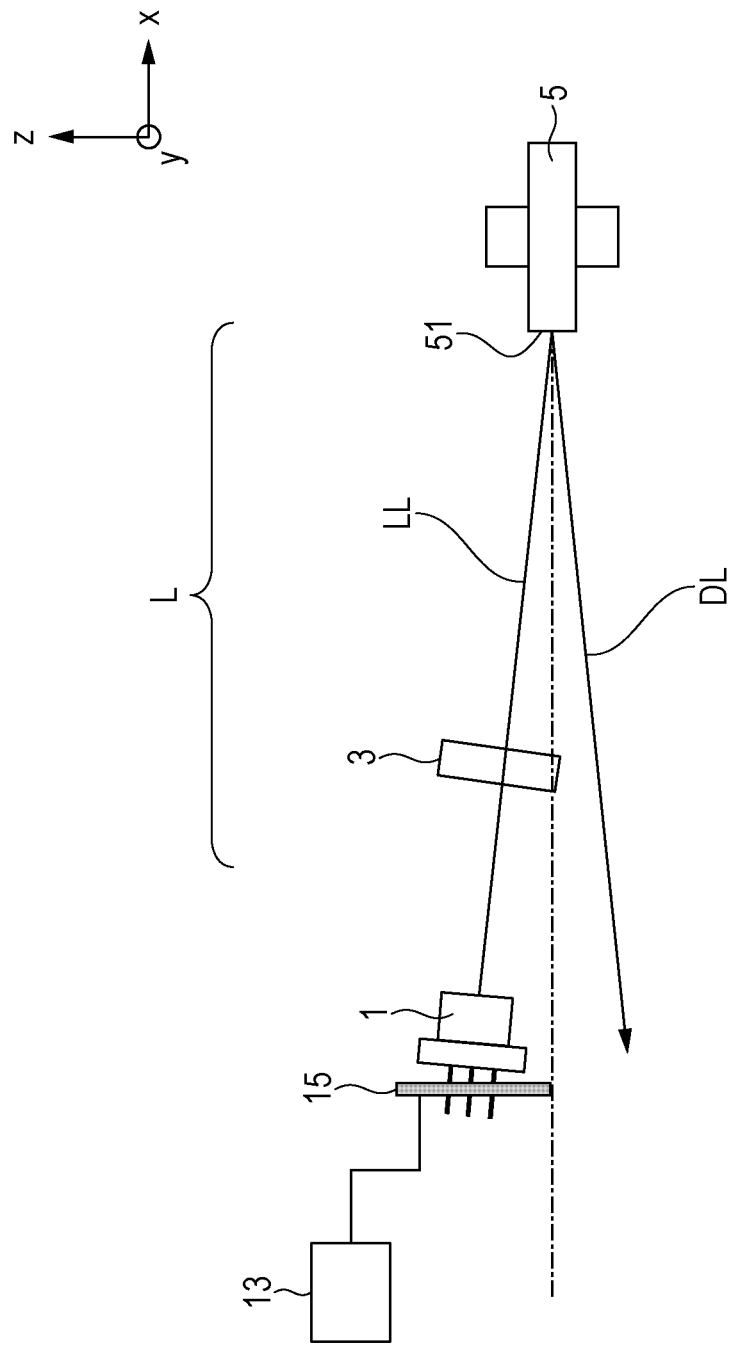
FIG. 9 is a sub-scanning sectional view of an incident optical system according to Example 3 of the present invention.

Next, an optical scanning device according to a second embodiment of the present invention is described. FIG. 8 is a schematic illustration (main-scanning sectional view) of a primary portion of an optical scanning device 700 according to this example. Also, FIG. 9 is a schematic illustration (sub-scanning sectional view) of a primary portion of an incident optical system L included in the optical scanning device 700. In FIG. 9, an optical path is developed so that the optical-axis direction of the incident optical system L is aligned with the optical-axis direction (X direction) of an imaging optical system 6 in FIG. 8. FIG. 9 illustrates only a chief ray of light beams while omitting marginal rays.

The optical scanning device 700 according to this embodiment includes a light source 1, a deflecting unit 5 that deflects light beams emitted from the light source 1 and optically scans a scanned surface 7 in a main-scanning direction (direction indicated by arrow B), and an incident optical system L that guides the light beams from the light source 1 to a deflecting surface 51 of the deflecting unit 5. The incident optical system L causes the light beams from the light source 1 to be incident on the deflecting surface 51 from the outside of a scanned area (area through which scanning light beams for optical scanning on the scanned surface 7 pass) in a main-scanning section (in XY section).

Further, in the sub-scanning section (in ZX section) the incident optical system L according to this embodiment is an obliquely incident system that causes the light beams from the light source 1 to be obliquely incident on the deflecting surface 51 (obliquely incident with respect to the main-scanning section). Accordingly, the light beams deflected by the deflecting surface 51 can avoid returning to the light source 1.

Hence, the light source 1 can emit light even at a timing at which the light beams deflected by the deflecting surface 51 normally face the light source 1 in the main-scanning section, that is, a timing before and after the light beams from the incident optical system L are vertically incident (normally incident) on the deflecting surface 51 in the main-scanning section. Since the light detecting unit (light receiving unit) 15 receives the light beams emitted from the light source 1 at that timing, light quantity control can be executed on the basis of the detection signal output from the light detecting unit 15.

As described above, with the optical scanning device 700, since the light source 1 emits light even at a timing at which light beams reflected by a deflecting surface in a configuration of related art, the time required for the detection and control of the light quantity can be sufficiently ensured, and the light quantity control with high accuracy can be executed.

EXAMPLE 3

An optical scanning device 700 according to Example 3 of the present invention is described below in detail. The optical scanning device 700 according to this example has a configuration similar to the configuration according to the aforementioned embodiment.

A light source 1 according to this embodiment is a semiconductor laser as an end surface emitting laser. The light source 1 emits front light beams toward a deflecting unit 5 and at the same time emits rear light beams toward the opposite side of the deflecting unit 5 from the back side of the substrate. In this example, the font light beams are used as scanning light beams (light beams for optically scanning a scanned surface 7 and forming an image), and the rear light beams are used as detection light beams for the light quantity control.

Respective numerical values for optical arrangement and so forth of an incident optical system L according to this example are similar to those shown in Table 3 according to Example 1. Also, respective numerical values for optical arrangement and so forth of an imaging optical system 6 and shape data for respective lens surfaces of an imaging lens according to this example are similar to those shown in Table 1 and Table 2 according to Example 1.

The light quantity control in the optical scanning device 700 according to this example is described below in detail.

The optical scanning device 700 employs a method of automatically controlling the intensity of light beams emitted from the light source 1 (automatic power control, APC), by a light detecting unit 15 detecting light beams emitted from the light source 1 and feeding back an obtained detection signal to a driving circuit of the light source 1. Accordingly, the output (the light emitting quantity) of the light source 1 can be controlled to be constantly equivalent to the design value, and hence image formation can be stably executed regardless of a change in temperature.

As described above, in this example, the end surface emitting laser is used as the light source 1, and a photodetector (light quantity detecting element) serving as the light detecting unit 15 arranged in the laser package of the end surface emitting laser detects the rear light beams emitted from the back side of the laser substrate. Then, the light quantity control unit (APC unit) 13 executes the light quantity control on the basis of the detection signal output from the light detecting unit 15. The light quantity control unit 13 may employ a processor, such as a CPU or a MPU.

As shown in FIG. 9, incident light beams (front light beams) LL emitted from the light source 1 and being incident on the deflecting surface 51 are deflected toward the side of the incident optical system L when the deflecting surface 51 is at a specific deflection angle in the main-scanning section. In this case, since the incident optical system L causes the incident light beams LL to be obliquely incident at an incident angle of 3° with respect to the deflecting surface 51 in the sub-scanning section, deflected light beams DL deflected by the deflecting surface 51 do not return to the incident optical system L but are deflected downward, and are shielded by a light shielding portion (not shown).

As described above, in this example, since the incident optical system L is the obliquely incident system, a phenomenon, in which the deflected light beams DL return to the light source 1 and hence the accuracy of the light quantity control is decreased, can be avoided. Hence, the light source 1 can emit light even at a timing before and after the incident light beams LL are vertically incident on the deflecting surface 51 in the main-scanning section, that is, at a timing before and after the incident light beams LL and the deflected light beams DL (the optical axis of the incident optical system L and the surface normal of the deflecting surface 51) overlap each other.

Figure 10:
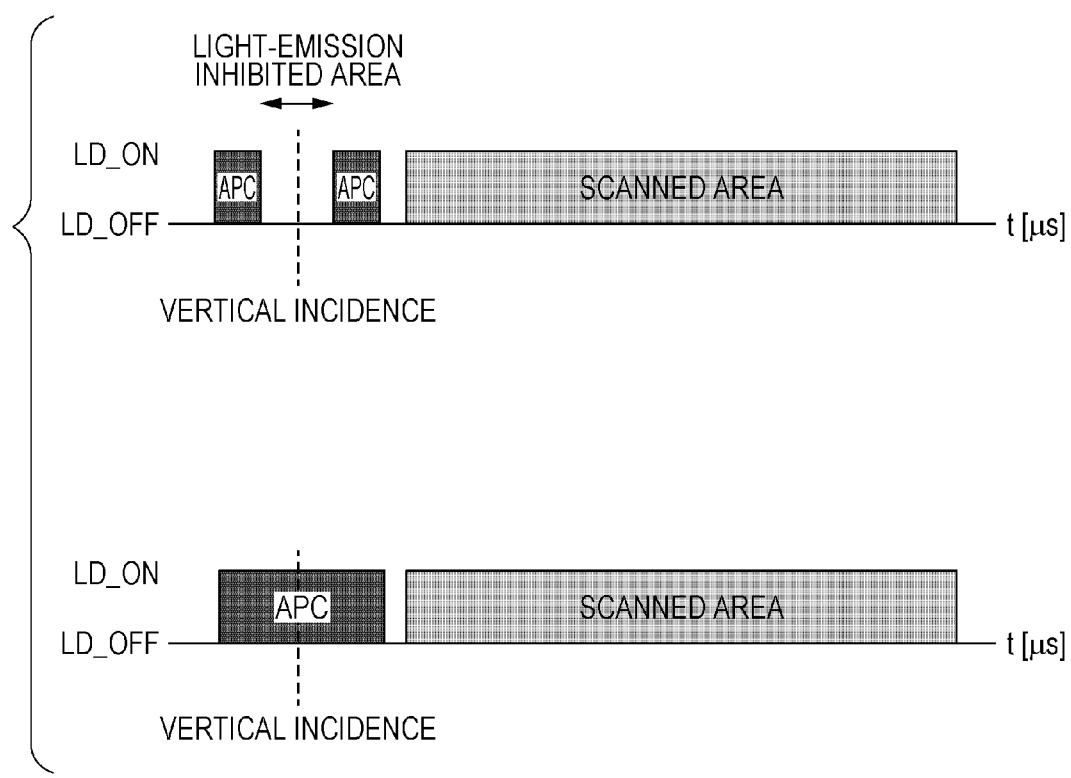
FIG. 10 provides illustrations showing light emitting timings of light sources according to Example 3 of the present invention and a comparative example.

FIG. 10 provides timing charts indicative of light emitting timings of light sources. The upper illustration in FIG. 10 illustrates a timing chart according to a comparative example. The lower illustration in FIG. 10 illustrates a timing chart according to this example. In the comparative example, it is expected to execute light quantity control in an optical scanning device of related art including an incident optical system not being an obliquely incident system. As shown in FIG. 10, the light quantity control is required to be executed before light beams reach a scanned area (effective scan area) on a scanned surface. This is because the density of a formed image may be uneven due to a change in light quantity if the light quantity control is executed while light beams pass through the scanned area.

In the comparative example, as shown in the upper illustration in FIG. 10, the light source is required to stop emitting light at a timing at which light beams reflected by a deflecting surface return to the light source (timing before and after light beams are vertically incident on the deflecting surface). The time for the detection and control of the light quantity cannot be sufficiently ensured, and the time for the detection and control of the light quantity is divided and becomes discontinuous before and after the timing. Hence, it is difficult to execute light quantity control with high accuracy.

In contrast, in this example, as shown in the lower illustration in FIG. 10, the light source can emit light even at a timing at which light beams are vertically incident on the deflecting surface. Accordingly, the detection and control of the light quantity can be executed continuously for a sufficient period of time before and after the timing at which the light beams are vertically incident on the deflecting surface.

EXAMPLE 4

Figure 11:
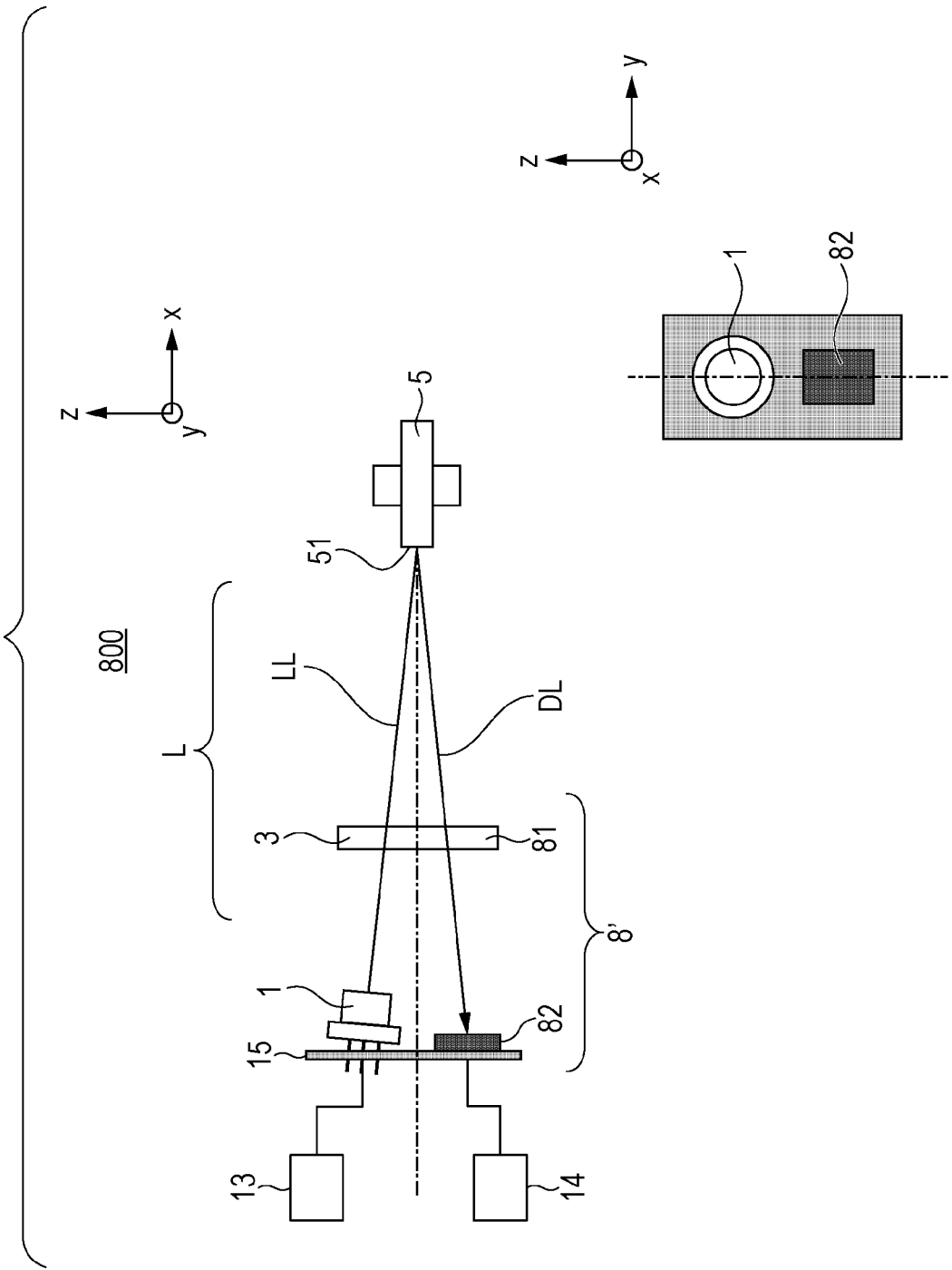
FIG. 11 provides schematic illustrations of primary portions of an incident optical system and a synchronous detection unit according to Example 4 of the present invention.

An optical scanning device 800 according to Example 4 of the present invention is described below in detail. The optical scanning device 800 according to this example differs from the optical scanning device 700 according to Example 3 in that the optical scanning device 800 includes a synchronous detection unit 8' and hence can simultaneously execute light quantity control and synchronous detection. FIG. 11 provides schematic illustrations showing primary portions of an incident optical system L and the synchronous detection unit 8' included in the optical scanning device 800. The upper illustration in FIG. 11 indicates a sub-scanning sectional view, and the lower illustration in FIG. 11 indicates a front view. The optical scanning device 800 has a configuration similar to the configuration of the optical scanning device 700 except for the synchronous detection unit 8'.

The synchronous detection unit 8' includes a synchronous detection lens (synchronous detection optical element) 81 that guides and condenses deflected light beams DL deflected by a deflecting surface 51, and a synchronous detection sensor (synchronous detection light receiving element) 82 that receives the light beams from the synchronous detection lens 81 and generates a synchronous signal. In this example, a synchronous control unit 14 determines a write-start position in the main-scanning direction on a scanned surface 7 on the basis of the synchronous signal output from the synchronous detection sensor 82.

As shown in the upper illustration in FIG. 11, in this example, a condenser lens 3 (first optical element) and the synchronous detection lens 81 (second optical element) are integrally formed (integrated) for decreasing the number of parts. However, these lenses may be separated from each other if required. Also, in this example, by mounting the light source 1 and the synchronous detection sensor 82 on the same substrate, a shift between relative positions of these members is restricted while the number of parts is decreased. Respective numerical values for optical arrangement and so forth of the synchronous detection unit 8' according to this example are similar to those shown in Table 4 according to Example 1.

As shown in the upper illustration in FIG. 11, incident light beams LL emitted from a light source 1 and being incident on the deflecting surface 51 are deflected downward of the incident optical system L at a certain deflection angle. Then, as shown in the lower illustration in FIG. 11, in this example, the incident optical system L and the synchronous detection unit 8' are arranged side by side in the sub-scanning direction to have the same incident angle in the sub-scanning section. Hence, deflected light beams DL are incident on the synchronous detection unit 8'.

As described above, with this example, the synchronous detection using front light beams emitted from the light source 1 can be executed simultaneously with the light quantity control using rear light beams emitted from the light source 1. At this time, since the incident optical system L is the obliquely incident system, the light quantity control and synchronous detection can be executed even at a timing before and after the incident light beams LL are vertically incident on the deflecting surface 51 in the main-scanning section.

Further, since the incident optical system L and the synchronous detection unit 8' are arranged side by side in the sub-scanning direction, the space for arranging the synchronous detection unit 8' can be decreased in the main-scanning section. Consequently, the scanning field angle of the deflecting unit 5 can be increased. The distance between the imaging optical system 6 and the scanned surface 7 can be decreased and the entire device can be reduced in size. Also, with the aforementioned configuration, since the incident optical system L and the synchronous detection unit 8' can be arranged at positions closer to the imaging optical system 6, an error between the scanning light beams and the deflected light beams DL can be decreased, and the synchronous detection can be executed with high accuracy.

To sufficiently reduce the entire device in size, like this example, the light source 1 desirably overlaps the synchronous detection sensor 82 in the main-scanning section, that is, the incident light beams LL desirably overlap the deflected light beams DL. The expression "aligned" includes not only strict alignment between both the chief rays of the incident light beams LL and the detected light beams DL in the main-scanning section, but also "substantial alignment" such as when both the light beams overlap each other over the entire optical path. However, the configuration is not limited thereto, and the light source 1 and the synchronous detection sensor 82 may be shifted from each other and arranged in the main-scanning section if required.

EXAMPLE 5

Figure 12:
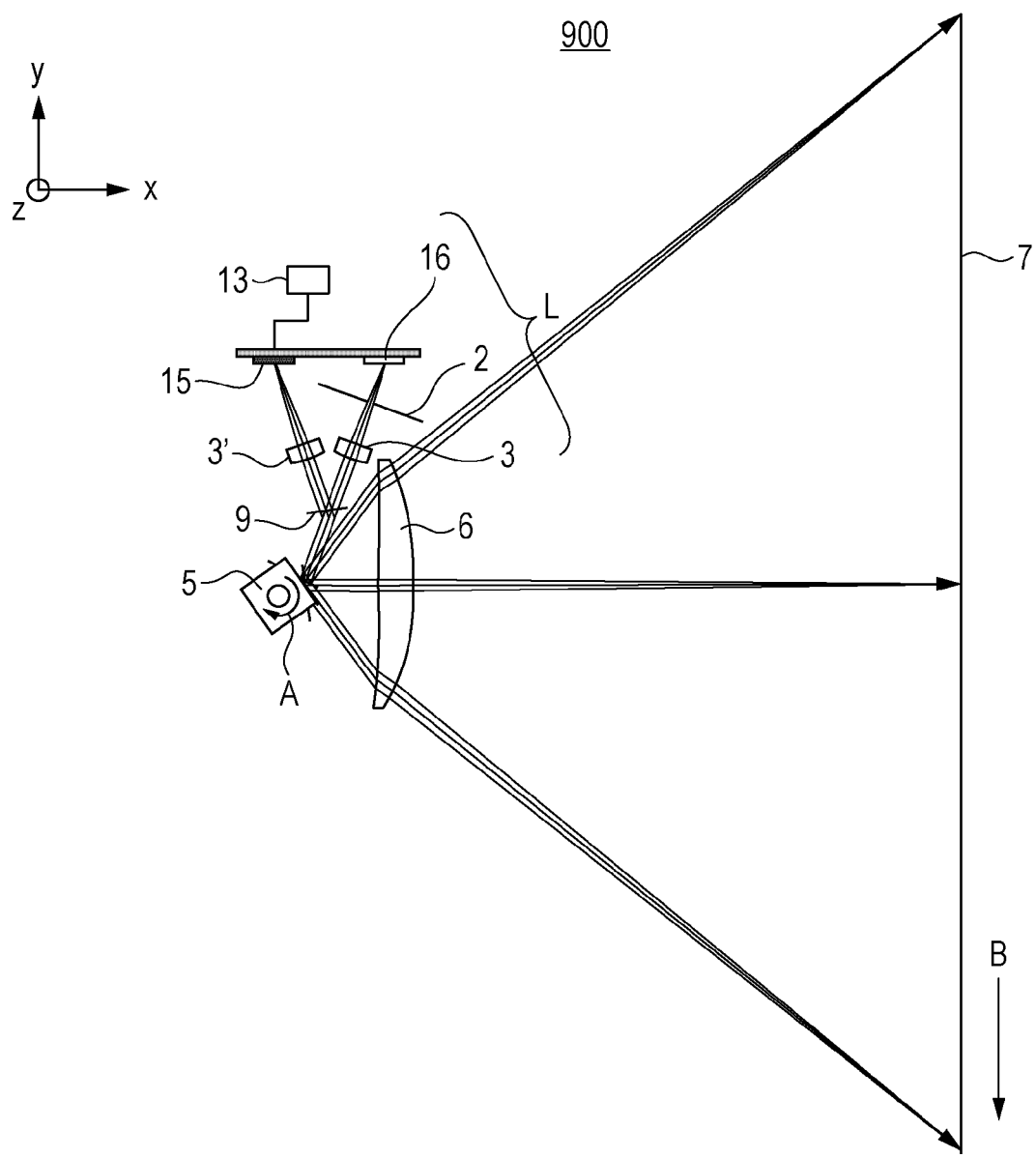
FIG. 12 is a main-scanning sectional view of an optical scanning device according to Example 5 of the present invention.
Figure 13:
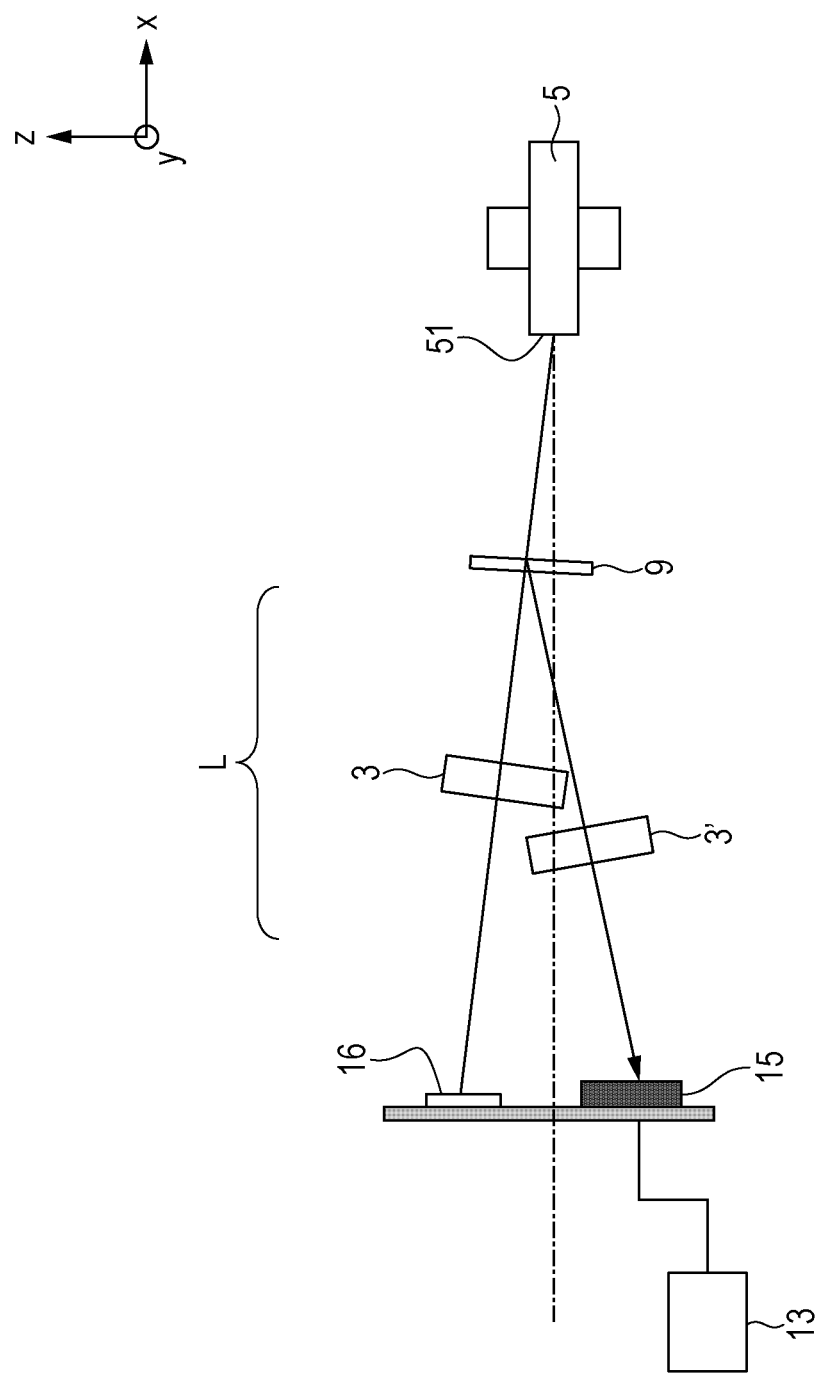
FIG. 13 is a sub-scanning sectional view of an incident optical system according to Example 5 of the present invention.

An optical scanning device 900 according to Example 5 of the present invention is described below in detail. The optical scanning device 900 according to this example differs from the optical scanning device 700 according to Example 3 in that the optical scanning device 900 employs a surface emitting laser as a light source 16 and executes light quantity control by using light beams separated by a light separating element 9. FIG. 12 is a schematic illustration (main-scanning sectional view) of a primary portion of the optical scanning device 900 according to this example. FIG. 13 is a schematic illustration (sub-scanning sectional view) of a primary portion of an incident optical system L included in the optical scanning device 900.

If the surface emitting laser is used as the light source 16, rear light beams are not emitted from the back side of a substrate unlike an end surface emitting laser. To execute the light quantity control it is required to separate and detect light beams emitted from the surface emitting laser toward a deflecting surface 51 if required. Owing to this, in this example, a half mirror serving as the light separating element 9 is arranged in an optical path between a condenser lens 3 and the deflecting surface 51 to separate the light beams from the light source 16 into light beams (transmitted light beams) directed toward the deflecting surface 51 and light beams (reflected light beams) directed toward a light detecting unit 15. Accordingly, the light detecting unit 15 can constantly detect the light quantity and hence the light quantity control with high accuracy can be executed.

In this example, a condenser lens 3' for condensing the reflected light beams from the light separating element 9 on a light receiving surface of the light detecting unit 15 is provided; however, the condenser lens 3 and the condenser lens 3' may be integrally formed if required. Also, the light separating element 9 is not limited to the half mirror, and may use, for example, a beam splitter corresponding to different intensities of the transmitted light beams and the reflected light beams, or a wedge-shaped prism (wedge prism) having an incident surface and an exit surface being non-parallel if required. Also, in this example, a synchronous detection sensor may be provided on a substrate on which the light source 1 and the light detecting unit 15 are mounted like Example 4, so that light quantity control and synchronous detection can be simultaneously executed.

Image Forming Apparatus

Figure 14:
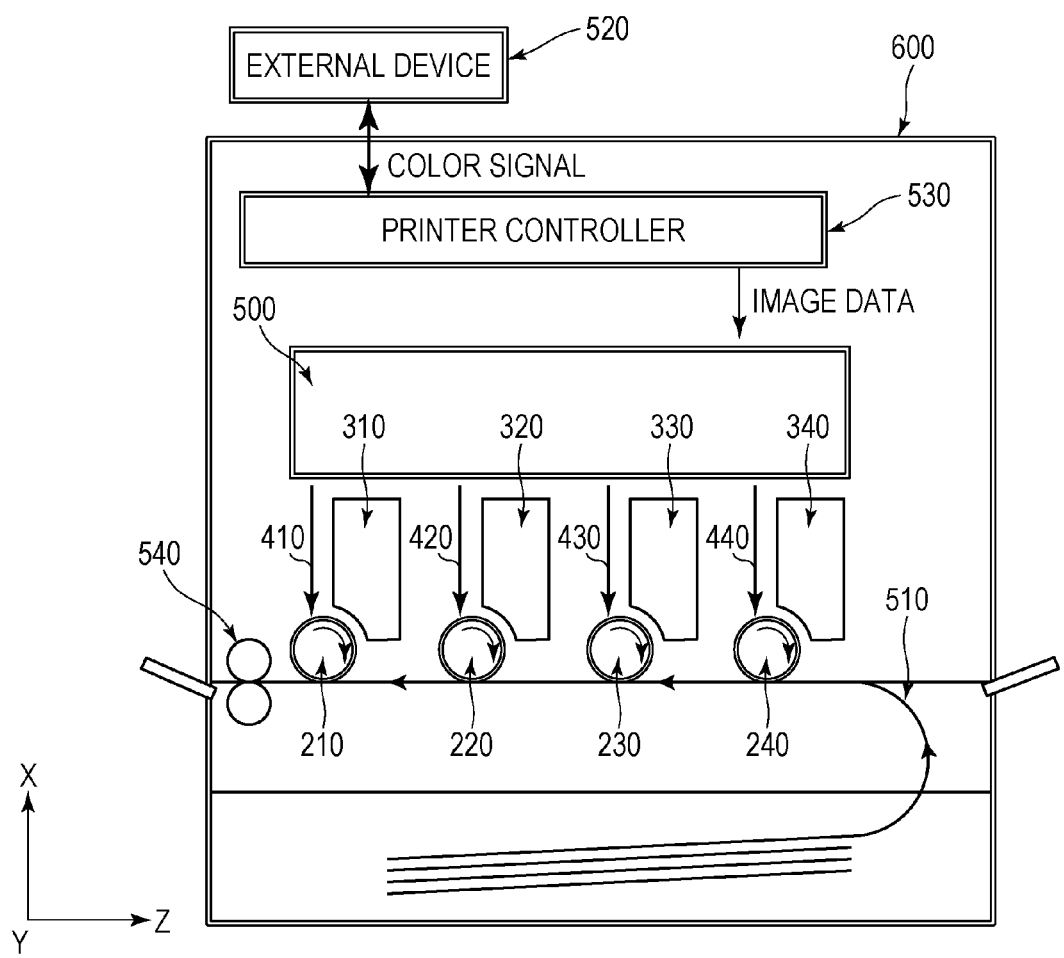
FIG. 14 is a sub-scanning sectional view of an image forming apparatus according to an embodiment of the present invention.

FIG. 14 is a schematic illustration (ZX sectional view) of a primary portion of an image forming apparatus 600 according to an embodiment of the present invention. The image forming apparatus 600 is a tandem-type color image forming apparatus that records image information concurrently on photosensitive surfaces (scanned surfaces) of four photosensitive drums (photosensitive members) by an optical scanning device 500.

The image forming apparatus 600 includes a printer controller 530, the optical scanning device 500, photosensitive drums 210, 220, 230, and 240 serving as image bearing members, developing units 310, 320, 330, and 340, a transport belt 510, and a fixing unit 540. The optical scanning device 500 may include four optical scanning devices according to Example 1, or may include two optical scanning devices according to Example 2. At this time, the optical scanning device 500 is arranged so that the main-scanning direction is aligned with the Y-axis direction in FIG. 14 and the sub-scanning direction is aligned with rotation directions (circumferential directions) of the photosensitive drums 210 to 240.

As shown in FIG. 14, an external device 520 such as a personal computer outputs respective color signals of R (red), G (green), and B (blue). The printer controller 530 converts the respective color signals into respective pieces of image data (dot data) of Y (yellow), M (magenta), C (cyan), and K (black). The respective pieces of converted image data are input to the optical scanning device 500. The printer controller 530 not only converts the aforementioned signals, but also executes control of respective components in the image forming apparatus 600, such as a motor (described later).

The optical scanning device 500 provides optical scanning with light beams 410, 420, 430, and 440 modulated in accordance with the respective pieces of image data, on the photosensitive surfaces of the photosensitive drums 210 to 240 in the main-scanning direction (Y direction). The photosensitive drums 210 to 240 are rotated clockwise by a motor (not shown). With this rotation, the respective photosensitive surfaces move in the sub-scanning direction (circumferential direction) with respect to the light beams 410 to 440. The respective photosensitive surfaces electrically charged with charging rollers (not shown) are respectively exposed to the light beams 410 to 440, and hence electrostatic latent images are respectively formed on the photosensitive surfaces.

The developing units 310 to 340 develop the electrostatic latent images of the respective colors formed on the respective photosensitive surfaces of the photosensitive drums 210 to 240, as toner images. Transfer units (not shown) transfer the toner images of the respective colors on a transferred material transported by the transport belt 510 in a superimposed manner. The fixing unit 540 fixes the superimposed toner images. By the aforementioned steps, a single full-color image is formed.

The optical scanning device 500 is only required to include at least the incident optical system and the light receiving unit according to each of the examples, and may be a tandem-type optical scanning device that provides optical scanning on four scanned surfaces by a single deflecting unit. Also, a color image reading device including a line sensor, such as a CCD sensor or a CMOS sensor, may be connected as the external device 520 with the image forming apparatus 600 to configure a color digital copier.

Modifications

The desirable embodiments and examples of the present invention have been described above; however, the present invention is not limited thereto, and various combination, modification, and change can be made within the scope of the idea of the present invention.

For example, in each of aforementioned Example 1 to Example 4, the semiconductor laser having only one light emitting point as a light source is employed; however, it is not limited thereto. If required, a monolithic multi-beam laser having a plurality of light emitting points may be employed to execute image formation at high speed on a scanned surface. The laser having the plurality of light emitting points may employ, for example, a vertical cavity surface emitting laser (VCSEL). Example 5 may employ VCSEL. Also, the number, material, and shapes of imaging optical elements forming the imaging optical system may be changed in accordance with the configuration of the optical scanning device.

In Example 2, the single deflecting surface provides optical scanning on the two scanned surfaces; however, it is not limited thereto. Light from three or more incident optical systems may be deflected by a single deflecting surface to provide optical scanning on three or more scanned surfaces. Alternatively, a plurality of deflecting surfaces may provide optical scanning on a plurality of scanned surfaces. If a plurality of incident optical systems are provided, similarly to Example 1, members such as optical elements and aperture stops arranged in respective optical paths may be integrated.

Also, in the respective optical paths from the deflecting surfaces to the plurality of scanned surfaces, imaging lenses may be individually arranged, or an integrated imaging lens may be shared by the optical paths. Further, in Example 2, only the single light receiving unit corresponding to the single light source is provided, and light emitting timings of a plurality of light sources are controlled by using the synchronous signal. However, a plurality of light receiving units corresponding to the plurality of light sources may be provided. Also, if the light source having the plurality of light emitting points is employed, on the basis of a synchronous signal obtained by detecting a light beam from a single light emitting point, light emitting timings of the other light emitting points may be controlled. Alternatively, light beams from the respective light emitting points may be individually detected and controlled.

In each of aforementioned Examples 1 and 2, the control circuit that determines the write-start position in the main-scanning direction on the scanned surface is mounted in the optical scanning device; however, it is not limited thereto. The control circuit may be mounted outside the optical scanning device although the control circuit is arranged in the image forming apparatus. In this case, the control circuit may be provided at the printer controller included in the image forming apparatus.

If the multi-beam laser is employed, the light quantity control cannot be simultaneously executed for all the plurality of light emitting points. Therefore, it is required to sequentially detect the plurality of light beams and execute the light quantity control at the respective light emitting points. If the multi-beam laser is applied to the aforementioned comparative example, the time for detection and control of the light quantity cannot be sufficiently ensured in single scanning. Hence, it is required to execute optical scanning many times until the light quantity control for all the light emitting points is completed. The total period of time for the light quantity control may be increased. In contrast, if the multi-beam laser is applied to any one of Examples 3 to 5, the period of time for the light quantity control can be sufficiently ensured. Hence, the total period of time for the light quantity control can be decreased.

Also, in each of Examples 3 and 4, the light quantity control is executed by detecting the rear light beams emitted from the end surface emitting laser. However, the light quantity control may be executed by detecting the front light beams if required. At this time, for example, in Example 3, a light detecting unit may be provided at the position of the synchronous detection sensor according to Example 4, and in Example 4, a light detecting unit may be provided on the same substrate as the substrate of the synchronous detection sensor, at a position next to the synchronous detection sensor. Alternatively, like Example 5, the front light beams may be separated and detected by the light separating element. In each of Examples 3 to 5, a light detecting unit may be used as a synchronous detection sensor and synchronous detection may be executed on the basis of a signal from the light detecting unit, and light quantity detection and synchronous detection may be simultaneously executed by a single light detecting unit.

In each of Examples 3 to 5, the light emitting timing control of the light source may be executed by a control unit provided in the light source, or may be executed by an externally provided control unit. Also, the light quantity control unit and the synchronous control unit may be arranged in the optical scanning device or in the image forming apparatus. At this time, at least one of the light quantity control, the synchronous control, and the light emitting timing control of the light source may be executed by a single control unit.

In each of Examples 3 to 5, the light beams from the single light source provide optical scanning on the single scanned surface; however, it is not limited thereto. Light beams from a plurality of light sources may provide optical scanning on a plurality of scanned surfaces. At this time, a single deflecting surface may simultaneously deflect a plurality of light beams, or a plurality of deflecting surfaces may deflect a plurality of light beams. At this time, in the respective optical paths from the deflecting surfaces to the plurality of scanned surfaces, imaging lenses may be individually arranged, or an integrated imaging lens may be shared by the optical paths.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-148157, filed Jul. 27, 2015 and No. 2016-094831 filed May 10, 2016, which are hereby incorporated by reference herein in their entirety.

What is claimed is:

1. An optical scanning device comprising:
a deflecting unit having a first deflecting surface, and arranged to deflect a light beam and optically scan a scanned surface in a main-scanning direction;
an incident optical system arranged to cause the light beam to be obliquely incident on the first deflecting surface in a sub-scanning section;
an imaging optical system arranged to guide a light beam deflected by the first deflecting surface onto the scanned surface; and
a light receiving unit arranged to receive a light beam deflected by the first deflecting surface and generate a signal,
wherein the incident optical system and the imaging optical system do not include optical elements integrally formed with each other, and
wherein a following condition is satisfied, $$|\beta| \le |\alpha|,$$

where $\alpha$ (deg) is an incident angle of the light beam from the incident optical system with respect to the first deflecting surface in the sub-scanning section, and $\beta$ (deg) is an angle defined by the light beam incident on the first deflecting surface and the light beam deflected by the first deflecting surface and directed toward the light receiving unit in a main-scanning section.

2. The optical scanning device according to claim 1, wherein at least one of following conditions is satisfied, $$1.5 \le |\alpha| \le 10, \text{ and}$$

$$0 \le |\beta| \le 5.0.$$

3. The optical scanning device according to claim 1, wherein at least one of following conditions is satisfied, $$1.5 \le |\alpha| \le 5.0, \text{ and}$$

$$0 \le |\beta| \le 3.0.$$

4. The optical scanning device according to claim 1, wherein the light beam incident on the first deflecting surface is aligned with the light beam deflected by the first deflecting surface and directed toward the light receiving unit in the main-scanning section.

5. The optical scanning device according to claim 1, wherein the light receiving unit is arranged downstream of the incident optical system in a rotation direction of the deflecting unit.

6. The optical scanning device according to claim 1, wherein an optical path between the incident optical system and the first deflecting surface and an optical path between the first deflecting surface and the light receiving unit each are an optical path in which a chief ray of the light beam is not refracted or reflected in the main-scanning section.

7. The optical scanning device according to claim 1, wherein the incident optical system includes a first optical element arranged to condense a light beam, the light receiving unit includes a second optical element arranged to condense a light beam, and the first and second optical elements are integrated.

8. The optical scanning device according to claim 1, wherein the incident optical system includes a light source arranged to emit a light beam, the light receiving unit includes a photoelectric conversion element arranged to receive a light beam, and the light source and the photoelectric conversion element are mounted on a same substrate.

9. The optical scanning device according to claim 1, wherein the incident optical system includes a plurality of incident optical systems, and the deflecting unit deflects light beams from the plurality of incident optical systems and optically scans a plurality of scanned surfaces.

10. The optical scanning device according to claim 9, wherein the respective light beams from the plurality of incident optical systems have different incident angles with respect to the first deflecting surface in the main-scanning section.

11. The optical scanning device according to claim 9, wherein the respective light beams from the plurality of incident optical systems have incident angles having equivalent absolute values with respect to the first deflecting surface in the sub-scanning section.

12. The optical scanning device according to claim 1, wherein the light receiving unit generates a signal for determining a write-start position on the scanned surface in the main-scanning direction.

13. The optical scanning device according to claim 1, further comprising a control circuit arranged to determine a write-start position on the scanned surface in the main-scanning direction on the basis of the signal.

14. The optical scanning device according to claim 1, further comprising:
a light source,
wherein the incident optical system causes a light beam from the light source to be incident on the first deflecting surface from the outside of a scanned area in the main-scanning section, and
wherein the light source emits the light beam at a timing at which the light beam from the incident optical system is vertically incident on the first deflecting surface in the main-scanning section.

15. The optical scanning device according to claim 14, wherein the light receiving unit receives the light beam reflected by the first deflecting surface at the timing and generates a signal.

16. The optical scanning device according to claim 15, further comprising a synchronous control unit arranged to determine a write-start position on the scanned surface in the main-scanning direction on the basis of the signal.

17. The optical scanning device according to claim 14, further comprising:

a light detecting unit arranged to receive the light beam emitted from the light source at the timing and to generate a signal; and
a light quantity control unit arranged to control a light emitting quantity of the light source on the basis of the signal.

18. The optical scanning device according to claim 17, further comprising a light separating element arranged to separate the light beam from the light source into a light beam directed toward the first deflecting surface and a light beam directed toward the light detecting unit.

19. An image forming apparatus comprising:
an optical scanning device;
a developing unit arranged to develop an electrostatic latent image formed on a scanned surface by the optical scanning device, as a toner image;
a transfer unit arranged to transfer the developed toner image on a transferred material; and
a fixing unit arranged to fix the transferred toner image to the transferred material,
wherein the optical scanning device includes a deflecting unit having a first deflecting surface and arranged to deflect a light beam and optically scan the scanned surface in a main-scanning direction, an incident optical system arranged to cause the light beam to be obliquely incident on the first deflecting surface in a sub-scanning section, an imaging optical system arranged to guide a light beam deflected by the first deflecting surface onto the scanned surface, and a light receiving unit arranged to receive a light beam deflected by the first deflecting surface and generate a signal,
wherein the incident optical system and the imaging optical system do not include optical elements integrally formed with each other, and
wherein a following condition is satisfied, $$|\beta| \le |\alpha|,$$

where $\alpha$ (deg) is an incident angle of the light beam from the incident optical system with respect to the first deflecting surface in the sub-scanning section, and $\beta$ (deg) is an angle defined by the light beam incident on the first deflecting surface and the light beam deflected by the deflecting surface and directed toward the light receiving unit in a main-scanning section.

20. An optical scanning device comprising:
a light source;
a deflecting unit having a first deflecting surface, and arranged to deflect a light beam from the light source and optically scan a scanned surface in a main-scanning direction; and
an incident optical system arranged to guide the light beam from the light source to the first deflecting surface; and
an imaging optical system arranged to guide a light beam deflected by the first deflecting surface onto the scanned surface,
wherein the deflecting unit is formed of a single rotating polygon mirror,
wherein the incident optical system and the imaging optical system do not include optical elements integrally formed with each other,
wherein the incident optical system causes the light beam to be incident on the first deflecting surface from the outside of a scanned area in a main-scanning section, and causes the light beam to be obliquely incident on the first deflecting surface in a sub-scanning section, and wherein the light source emits the light beam at a timing at which the light beam from the incident optical system is vertically incident on the first deflecting surface in the main-scanning section.

* * * * *